US006921332B2

(12) United States Patent  
Fukunaga et al.

(10) Patent No.: US 6,921,332 B2
(45) Date of Patent: Jul. 26, 2005

(54) MATCH-STYLE 3D VIDEO GAME DEVICE AND CONTROLLER THEREFOR

(75) Inventors: Shozo Fukunaga, Himeji (JP); Ryo Ueda, Kobe (JP); Satoshi Ueda, Kobe (JP); Shigenobu Matsuyama, Kobe (JP)

(73) Assignee: Konami Corporation, Tokyo (JP)

( * ) Notice: Subject to any disclaimer, the term of this patent is extended or adjusted under 35 U.S.C. 154(b) by 33 days.

(21) Appl. No.: 10/015,110

(22) Filed: Nov. 13, 2001

(65) Prior Publication Data

US 2002/0065121 A1 May 30, 2002

(30) Foreign Application Priority Data

Nov. 16, 2000 (JP) .......................................... 2000-350252

(51) Int. Cl.[7] .............................................. A63F 13/00
(52) U.S. Cl. ................................ 463/8; 463/31; 463/36
(58) Field of Search ........................ 463/1, 8, 7, 36–39, 463/46; 345/7, 8, 706

(56) References Cited

U.S. PATENT DOCUMENTS

| 5,616,078 | A | * | 4/1997 | Oh ................................. 463/8 |
| 5,737,505 | A |   | 4/1998 | Shaw et al. |
| 5,742,264 | A | * | 4/1998 | Inagaki et al. ................. 345/8 |
| 5,864,333 | A |   | 1/1999 | O'Heir |
| 5,899,809 | A | * | 5/1999 | Landa Cosio .................. 463/8 |
| 5,905,525 | A | * | 5/1999 | Ishibashi et al. .............. 348/39 |
| 5,913,727 | A |   | 6/1999 | Ahdoot |
| 6,409,596 | B1 | * | 6/2002 | Hayashida et al. ........... 463/31 |
| 6,419,580 | B1 | * | 7/2002 | Ito ................................ 463/31 |
| 6,456,728 | B1 | * | 9/2002 | Doi et al. ..................... 382/103 |
| 6,522,312 | B2 | * | 2/2003 | Ohshima et al. ............... 345/8 |
| 6,549,641 | B2 | * | 4/2003 | Ishikawa et al. ............. 382/103 |

FOREIGN PATENT DOCUMENTS

| JP | 6-23148  | 2/1994 |
| JP | 9-138637 | 5/1994 |
| JP | 7-024143 | 1/1995 |

(Continued)

OTHER PUBLICATIONS

Borner, Reinhard, Research on autostereoscopic monitors and projection systems with lenticular creens, Spring 2000, http://atwww.hhi.de/3D_displays/publicat/prosp3w/prosp3e.html.*
KLOV.com, Police 911, circa 2000, http://www.klov.com/game_detail.php?letter=P&game_id=9066.*
Jan. 20, 1997 "Virtua Cop2 Killer Manual" Soft Bank Kabushiki Kaisha Manual, pp. 20–21.

Primary Examiner—Michael O'Neill
(74) Attorney, Agent, or Firm—Jordan and Hamburg LLP

(57) ABSTRACT

The present invention makes it possible to obtain operation signals to enable operation of a more complex game by individually detecting movement in at least two axial directions. The present invention provides a pair of right and left controllers 21 and 22 that generate operation signals based on which game action is instructed, each controller having a main section 210 in the shape of a glove in which the hand is inserted, and in which is mounted an acceleration sensor 2124 that individually detects movement in three axial directions x, y and z (front/back, right/left, up/down). Each detection signal is deemed an operation signal for game action.

15 Claims, 29 Drawing Sheets

FOREIGN PATENT DOCUMENTS

| | | | | |
|---|---|---|---|---|
| JP | 7-88252 | 4/1995 | | |
| JP | 7-185131 | 7/1995 | | |
| JP | 8-221187 | 8/1996 | | |
| JP | 9-138637 | 5/1997 | | |
| JP | 9-173645 | 7/1997 | | |
| JP | 09-173645 | * 7/1997 | ............. | A63F/9/22 |
| JP | 9-239151 | 9/1997 | | |
| JP | 10-214155 | 8/1998 | | |
| JP | 10-260672 | 9/1998 | | |
| JP | 2000-33184 | 2/2000 | | |
| JP | 2000-033184 | * 2/2000 | ........... | A63F/13/00 |
| JP | 2000-107444 | 4/2000 | | |
| JP | 2000-308756 | 11/2000 | | |
| WO | WO 97/46888 | 12/1997 | | |

* cited by examiner

PUNCH SEEN
FROM ABOVE x DIRECTION z DIRECTION

PUNCH SEEN
FROM ABOVE x DIRECTION z DIRECTION

PUNCH SEEN
FROM BESIDE x DIRECTION z DIRECTION

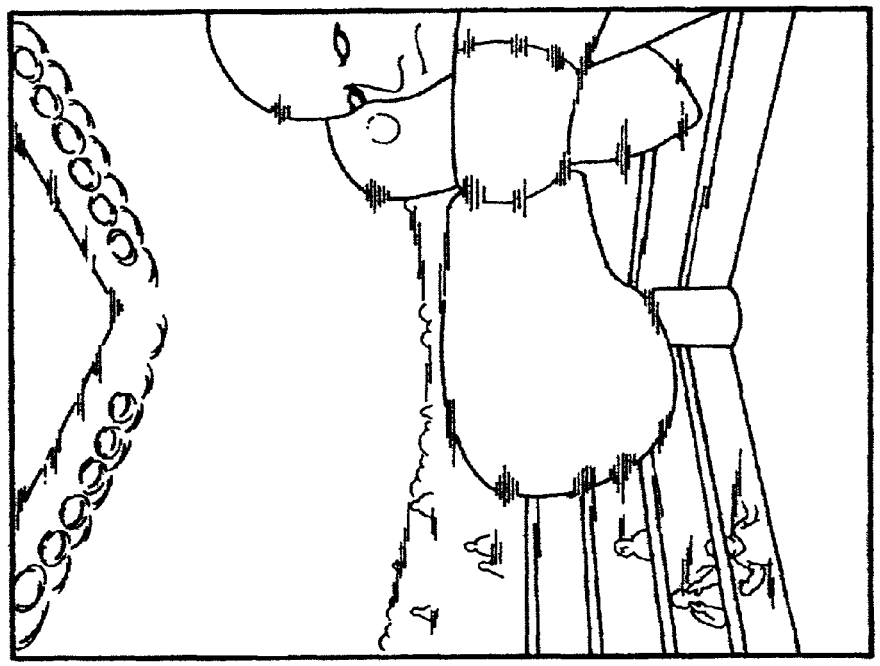
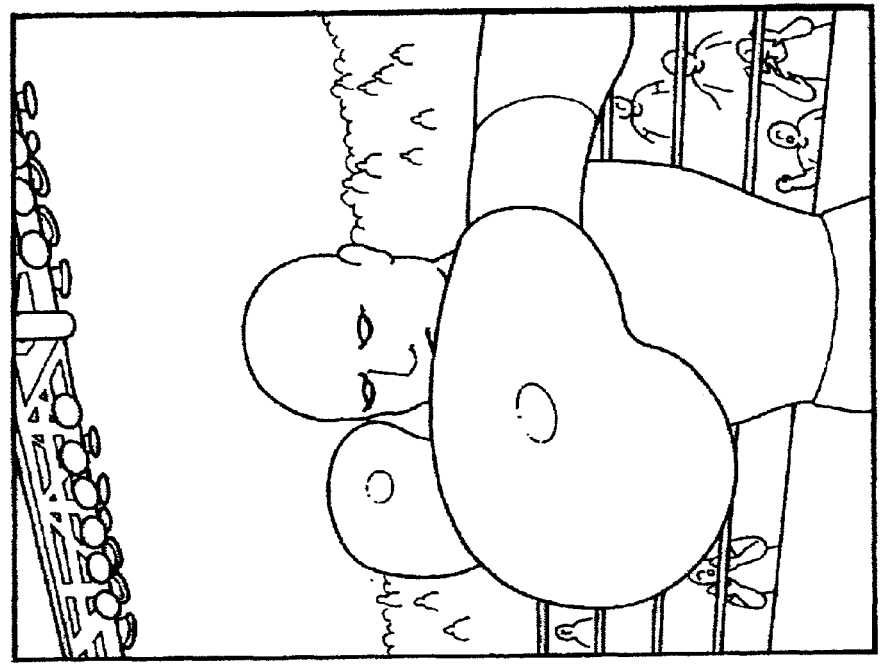

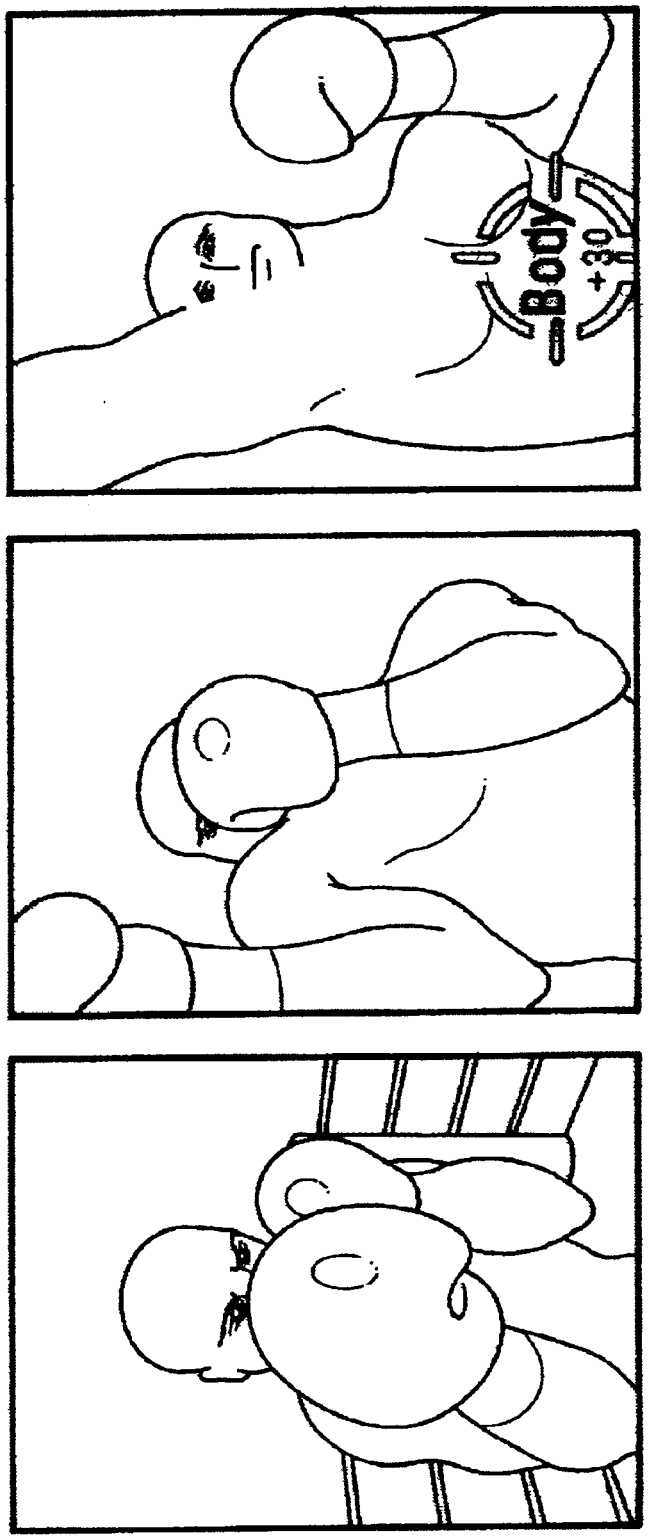

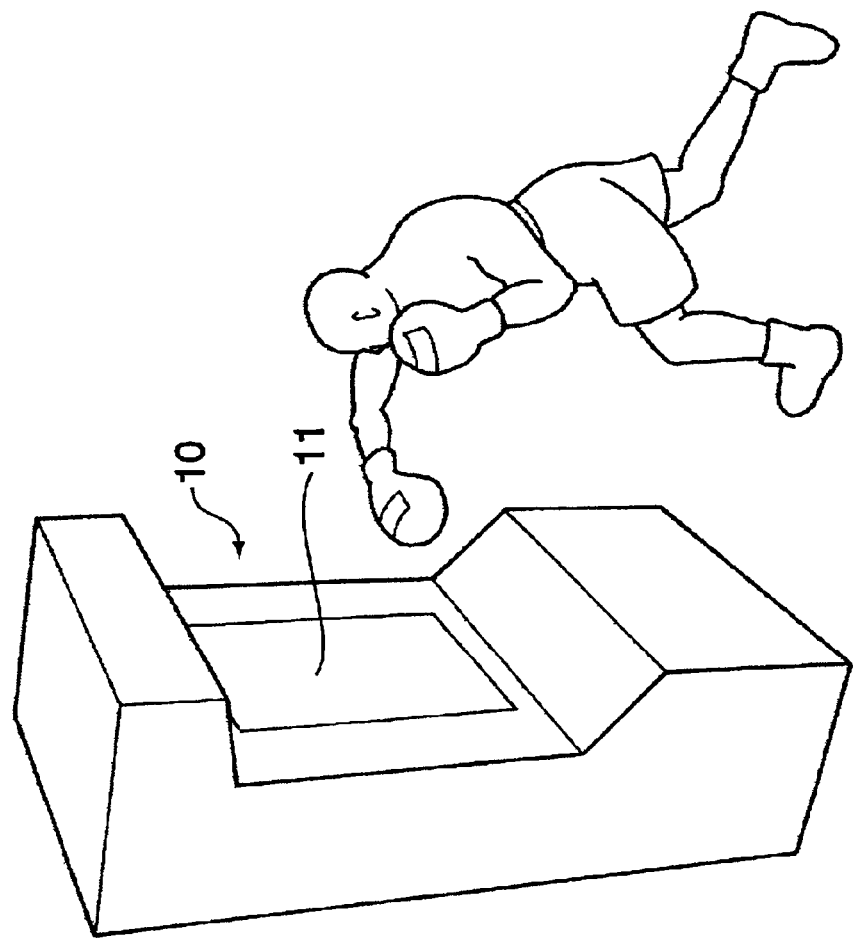
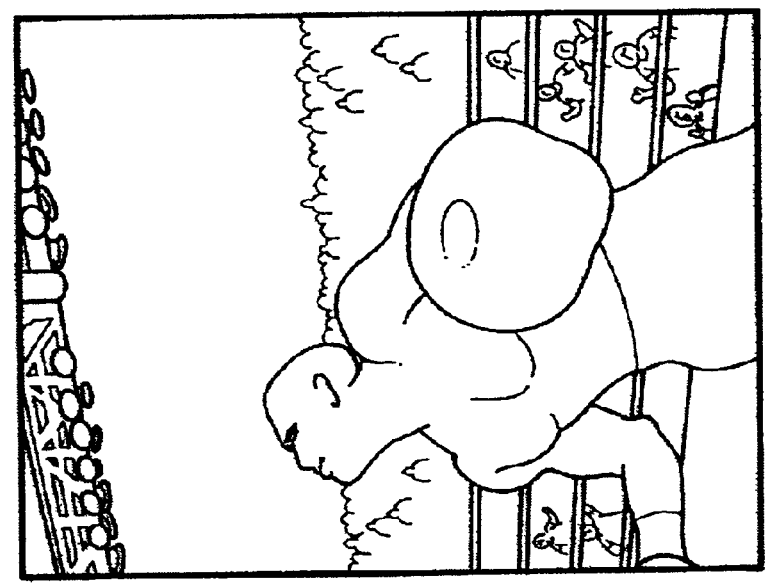

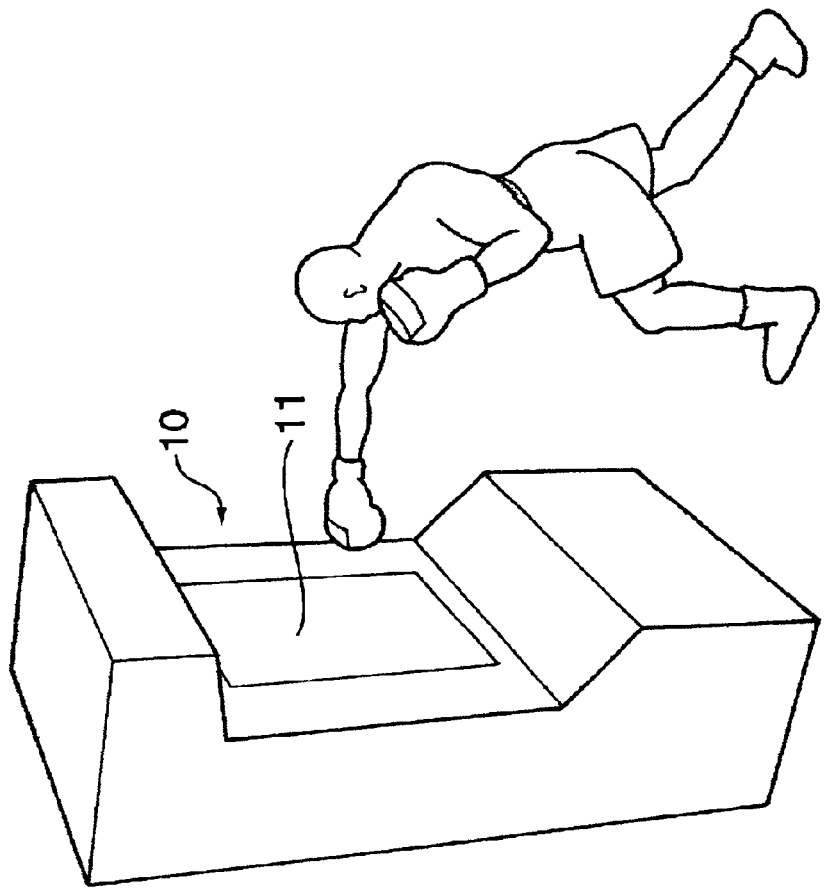
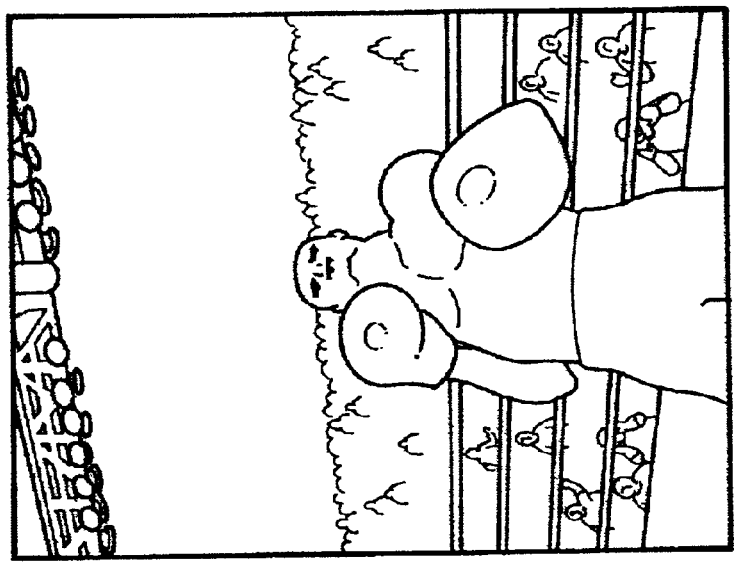
FIG. 22B
FIG. 22A

MATCH-STYLE 3D VIDEO GAME DEVICE AND CONTROLLER THEREFOR

BACKGROUND OF THE INVENTION

1. Field of the Invention

The present invention pertains to the controller of a match-style 3D video game device that generates operation signals to instruct game action, as well as to a match-style 3D video game device that uses this controller.

2. Description of the Related Art

Conventionally, among match-type games involving role-playing in which the player's character and an opponent character are displayed on a monitor screen, games have been proposed in which the movement of the player's legs is detected and the player's character is moved on the monitor screen in accordance with the detected movement. Among driving games, a viewpoint changing technology has been proposed by which a virtual three-dimensional car seat image is displayed in the monitor screen located in front of a player sitting in the car seat, and the camera's viewpoint is changed to a preset position in accordance with the leaning of the player's upper body to the right or left, or with the bending of the player's body forward.

Furthermore, a boxing video game device is known in which the opponent character is displayed in a monitor in front of the player, the player is imaged using a bird's-eye video camera, and the game is played based on the detection of the movement of the player's arms to determine whether or not punches have been thrown. Furthermore, musical games are known in which the imaginary movement of a virtual instrument being held by the player is detected by an acceleration sensor.

The viewpoint changing technology in driving games carries out smooth image changes via shifting among preset viewpoints, and does not have the virtual camera's viewpoint track the player's free movement.

Moreover, boxing video game devices entail the problem that they require a complex and elaborate processing system for the detection of the movement of the player's arms using the bird's-eye camera, and in particular, this technology is not easy to apply to games in which images must be updated on a frame cycle. In addition, in musical games, only certain movements are detected with regard to virtual instruments regarding which the method of operation (playing) is predetermined, and this technology lacks general applicability.

SUMMARY OF THE INVENTION

The present invention was created in view of these problems, and an object thereof is to provide a match-style 3D video game device controller and match-style 3D video game device in which motion is individually detected along at least two axes, and in which operation signals that enable more complex game action are obtained.

The present invention relates to a match-style 3D video game device controller that generates operation signals based on which game action instructions are issued, including a pair of right and left main units configured to allow manual operation and motion detection units that are each mounted in each main unit and individually detect movement along at least two axes, as well as output detected movement as operation signals.

Using this construction, if each main unit is moved by hand while being held by the player's right and left hands or worn like gloves, movement of the hand is detected in accordance with the direction of the movement of the main unit, and various types of games may be played based on this detection.

These and other objects, features and advantages of the present invention will become more apparent upon reading of the following detailed description along with the accompanied drawings.

BRIEF DESCRIPTION OF THE DRAWINGS

FIG. 10 shows the relationship between the type of punch and the output waveform for each sensor X, Y and Z, wherein

FIG. 11 shows the relationship between the type of punch and the output waveform for each sensor X, Y and Z, wherein

FIG. 12 shows the relationship between the type of punch and the output waveform for each sensor X, Y and Z, wherein

FIG. 18A is an image drawing showing the receipt of a punch from the opponent character from the right-hand side, while FIG. 18B is a screen drawing in which the viewpoint moves toward the left while shaking;

FIG. 19A is an image drawing showing the receipt of a punch from the opponent character from below, while

FIGS. 20A through 20C are screen drawings showing the opponent character throwing a punch and leaving an opening to the body when the punch was avoided by the player;

FIG. 21A is a screen drawing showing the receipt of a hook, and FIG. 21B is an image drawing showing the throwing of the punch;

FIG. 22A is a screen drawing showing the receipt of a straight punch, and FIG. 22B is an image drawing showing the throwing of the punch;

FIG. 30 shows yet another embodiment of the head detection unit, wherein

DETAILED DESCRIPTION OF THE INVENTION

Figure 1:
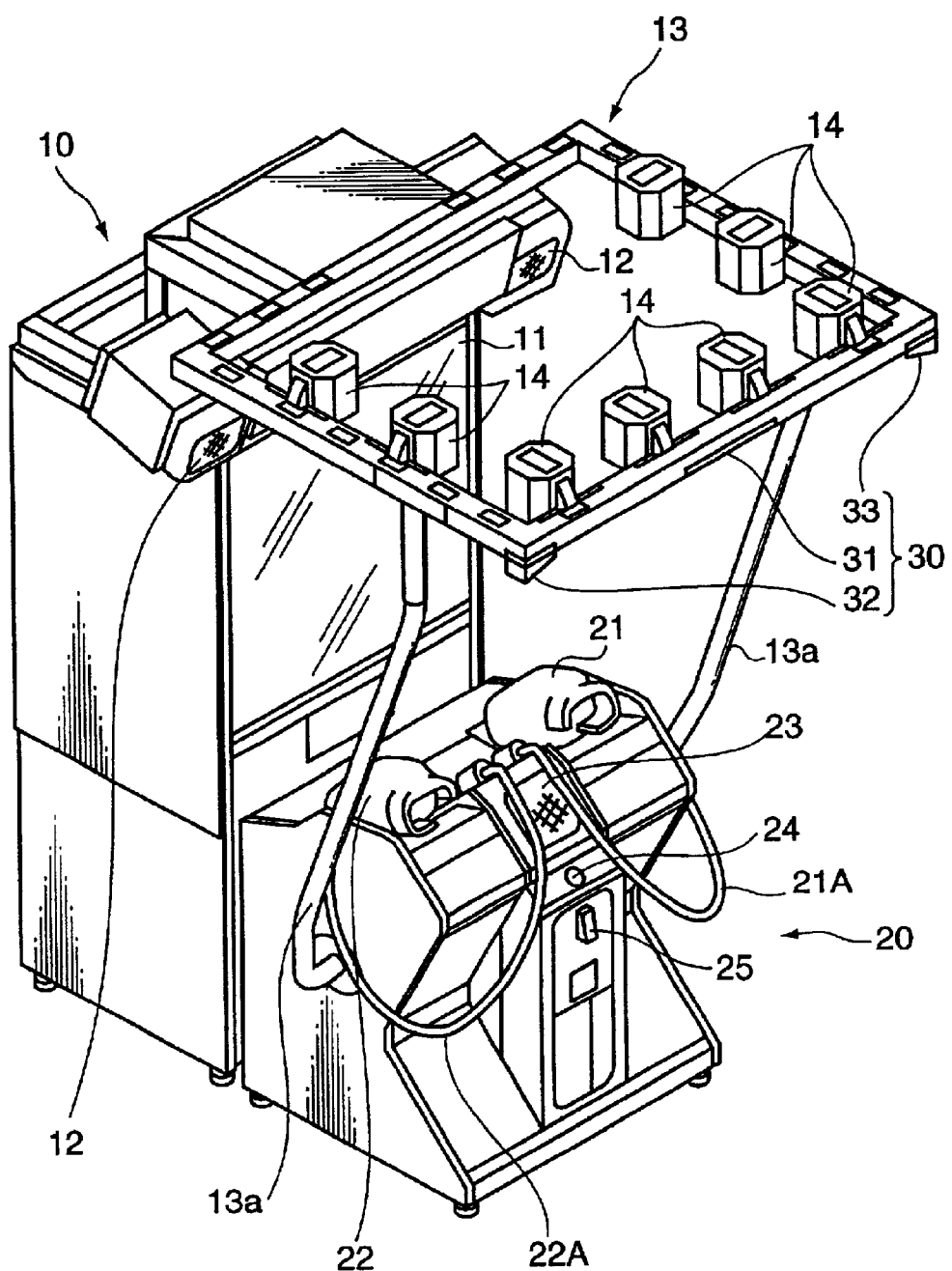
FIG. 1 is a perspective view of one embodiment of the virtual three-dimensional (3D) video game device pertaining to the present invention.
Figure 2:
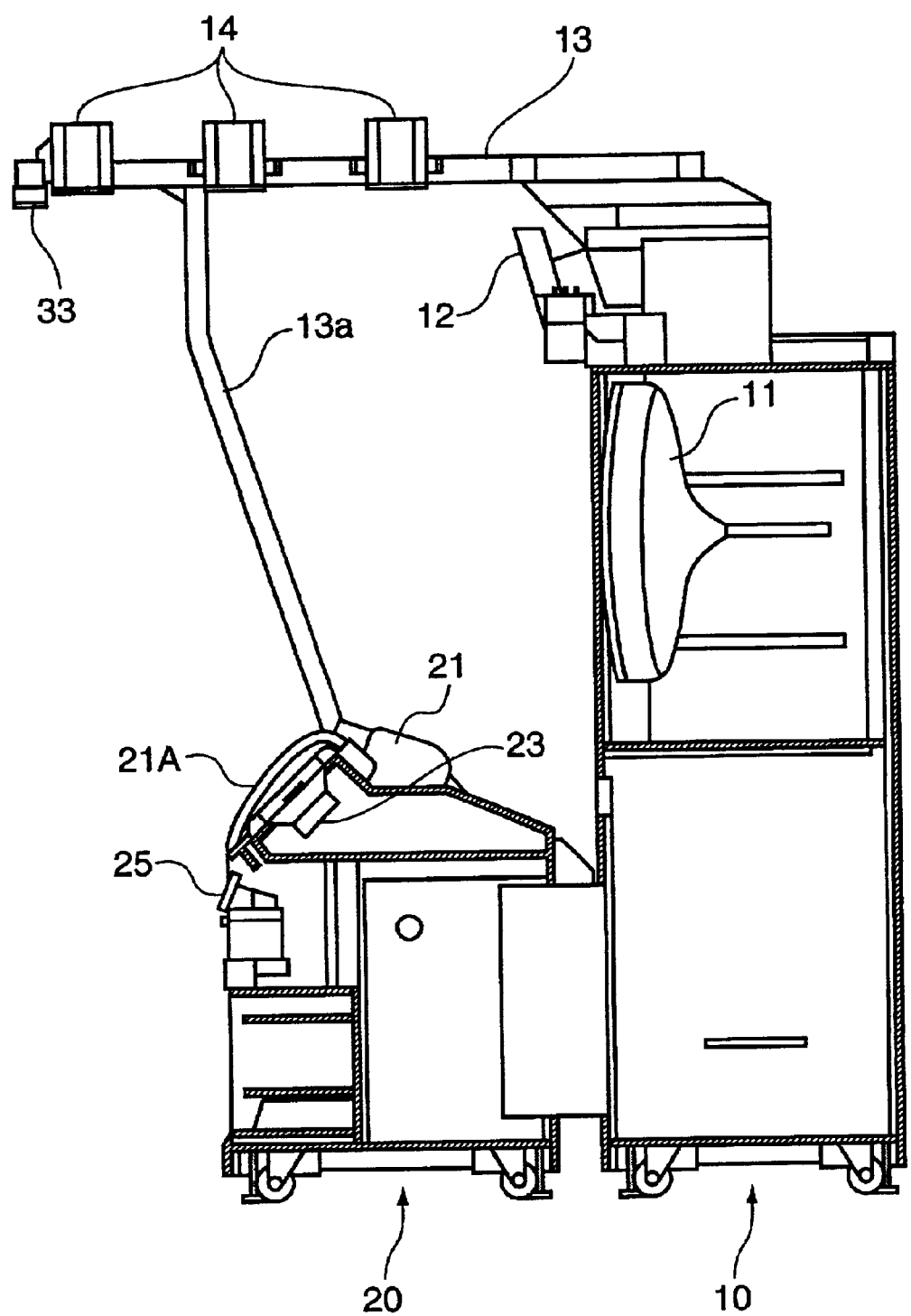
FIG. 2 is a side view of the 3D video game device shown in FIG. 1.

FIG. 1 is a perspective view showing one embodiment of the virtual three-dimensional (3D) video game device pertaining to the present invention, and FIG. 2 is a side view thereof. This game device comprises a game machine main unit 10, an operation unit 20 that is either permanently or detachably mounted to the front of the main unit or is provided separately from the main unit, and a head detection unit 30, wherein the area in front of the operation unit 20, i.e., the area underneath the head detection unit 30, is a play space in which the player is positioned and the game is played.

The game machine main unit 10 is a console box configured essentially as a rectangular parallelepiped. On it is mounted a monitor 11 of a prescribed size to display game images approximately in the center of the front surface of the main unit and preferably at a height such that the head of the player is roughly at the center of the image when the player playing the game adopts a normal posture. For the monitor 11, a CRT, LCD or plasma display, or a liquid crystal projector or similar device, may be used. At the top of the game machine main unit 10, preferably at the right and left sides thereof, are mounted speakers 12, 12 to reproduce sound effects, and between them is located a panel that displays the name of the game or other information. Inside the game machine main unit 10 is located a circuit board on which are formed controllers, etc. that are necessary to control the operation of the game. In addition, a square framework 13 extends forward toward the player from the top of the game machine main unit 10 like the visor of a cap, and support arms 13a are formed between appropriate locations on the right and left segments of the framework and the side surfaces of the operation unit 20. A prescribed number of illuminating light sources 14 of the three primary colors, for example, are formed on the frame segments of the framework 13 such that they face the game machine main unit.

Figure 3:
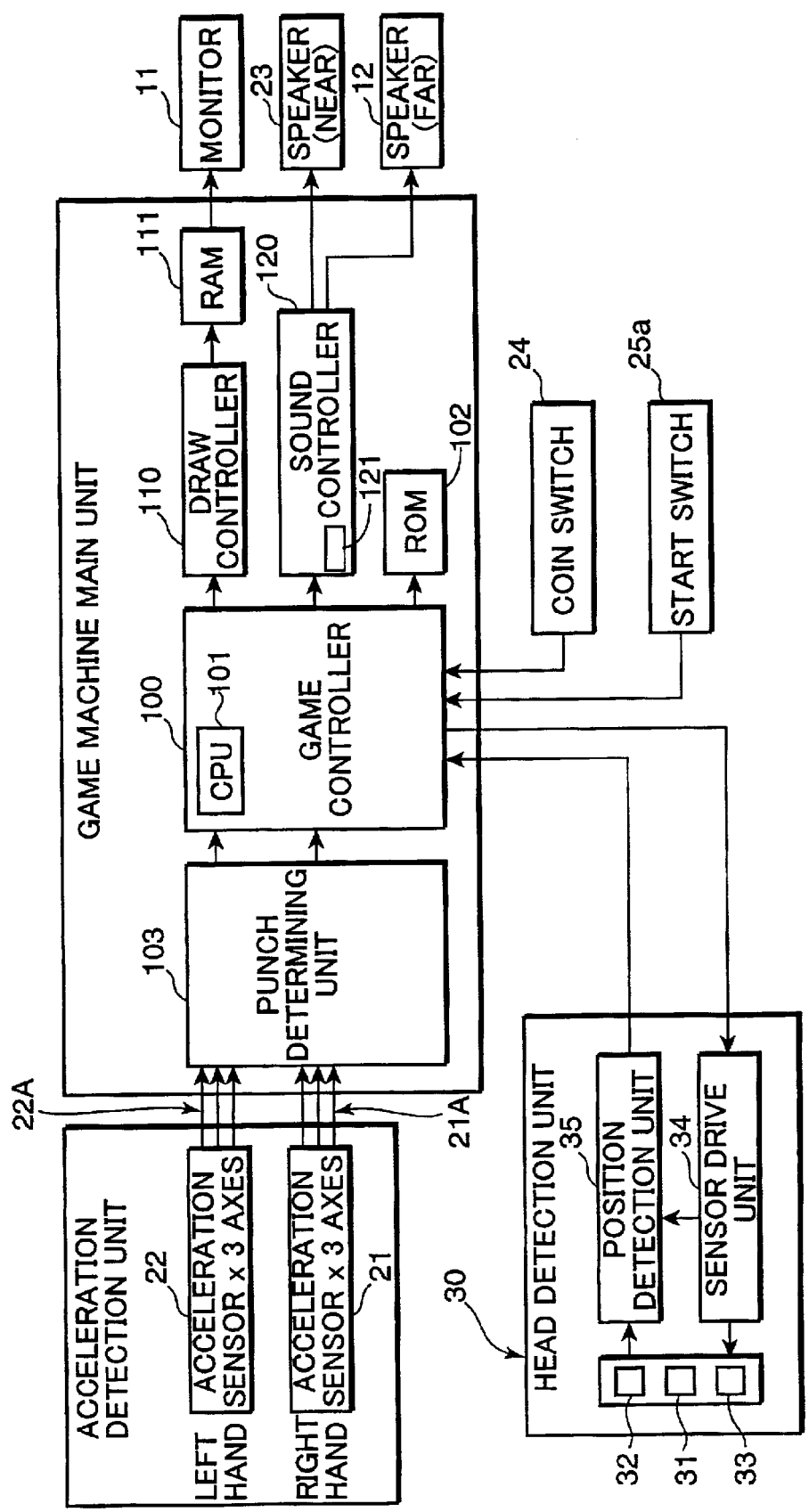
FIG. 3 is a block diagram of the 3D video game device.

The framework 13 functions as a support structure for the head detection unit 30, which is formed at the upper part of the play space, i.e., above the head of the player. The head detection unit 30 comprises an ultrasonic transmitter 31 that is located in the lengthwise center of the front frame segment of the framework 13 and that transmits sonic and ultrasonic waves as a communication medium, and ultrasonic receivers 32 and 33 which receive these ultrasonic waves that serve as a communication medium and which are located such that they are horizontally symmetrical relative to the ultrasonic transmitter. Alternatively, light, particularly infrared light, may be used as the communication medium. The ultrasonic transmitter 31 and the ultrasonic receivers 32 and 33 all comprise piezoelectric elements, etc. The ultrasonic transmitter 31 has a directional width sufficient to cover the play space, and transmits ultrasonic pulses of a prescribed width at prescribed cycles, for example, in cycles of $\frac{1}{60}^{th}$ of a second, or at cycles that enable changes in the position of the player's head to be tracked at a desired resolution. The ultrasonic receivers 32 and 33 have identical constructions, and have a directional width sufficient to enable them to receive ultrasonic waves that are transmitted by the ultrasonic transmitter 31 and reflected off the head of the player located in the play space. Inside the head detection unit 30 are located, as shown in FIG. 3, a sensor drive unit 34 that supplies drive signals (periodic excitation pulse signals) to the ultrasonic transmitter 31 and a position calculation unit 35 that is connected to the sensor drive unit 34 and the two ultrasonic receivers 32 and 33 and that calculates the position of the player's head within the play space. Alternatively, the sensor drive unit 34 and the position calculation unit 35 may be located inside the game machine main unit 10.

The operation unit 20 is positioned at a height lower than that of the monitor 11. It includes a speaker 23 that reproduces sound effects and that is located in the center of the slightly slanted upper front surface of the operation unit 20 facing the player, i.e., at a position closer to the player than the speakers 12, and a pair of glove units 21 and 22 that are located near the speaker 23 and are formed in the shape of boxing gloves in which the hands are inserted, and which function as game controllers and are mounted via cords 21A and 22A that also serve as control signal transmission lines. When unused, the glove units 21 and 22 are housed in prescribed locations on the top surface of the operation unit 20, while when they are in use, i.e., during the game, they are grasped by the player and are operated to throw punches at the opponent character displayed on the monitor screen, as described below. A start switch 24 and a coin inlet 25 are also located on the front surface of the operation unit 20. A coin switch 25a (see FIG. 3) that detects the existence of an inserted coin is located partway through the coin channel that connects to the coin inlet 25.

FIG. 3 is a block diagram of the game device. On the circuit board located inside the game machine main unit 10 are located a game controller 100, a screen draw controller 110 and a sound controller 120.

This game is a match-style game that simulates a boxing match, for example, between the player and an opponent character, a boxer who is displayed on the monitor screen. The opponent character displayed on the monitor screen is controlled by the game controller 100 such that it throws punches toward the viewpoints of the virtual camera. At the same time, while evading the punches thrown by the opponent character, the player throws punches at the opponent character on the monitor 11 using the glove units 21 and 22.

The game controller 100 includes a microcomputer (hereinafter referred to as a CPU) 101, for example, which controls the processing of the game action. Connected to the game controller 100 is a ROM 102 that serves as a recording medium to store the game program and necessary game images for the boxing match comprising the game, as well as various other necessary units in addition to the head detection unit 30. Alternatively, a CD-ROM, optical disk, floppy disk, DVD, etc., may be used as the recording medium.

The draw processing unit 110 performs processing to (i) calculate, from the viewpoint of the virtual camera in a virtual three-dimensional space, the coordinate position of each object (i.e., the opponent character, referee character, and player character (which appears in the 'objective viewpoint routine' display described below), the ring, the ceiling, the spectator seats, the fans, etc.), (ii) calculate the light source for the required object, (iii) calculate the conversion of the calculated coordinate positions in the virtual three-dimensional space to coordinate positions in a two-dimensional space and position the polygons comprising the image to be drawn in the display area of the RAM 111, and (iv) perform texture mapping for each polygon. For the virtual camera viewpoint information used for character coordinate position calculation, the position information transmitted from the head detection unit 30 is used as described below. Therefore, the virtual camera viewpoint essentially matches the view seen by the player ('subjective viewpoint routine'), and the character corresponding to the player is basically not displayed on the screen of the monitor 11.

The sound controller 120 reads out from the sound source data memory unit 121 in response to the game action sound source data already loaded into the game program, and drives either the speakers 12 or the speaker 23 to output the associated sound. As the sound source data, the various sounds heard at a boxing match, such as audience noise, applause, etc. are loaded as sounds associated with viewpoints. The sound source data is stored in the PCM data format, for example, and after it is read out, it undergoes D/A conversion, filtering and amplification and is output as sound to the speakers 12 or the speaker 23. The sound controller 120 also has a unit that performs processing to selectively alternate the sound output between the speakers 12 and 23 based on the distance to the viewpoint of the virtual camera, as described below.

In this game, the CPU 101 has a function to determine whether or not to deem a punch from the opponent character as having landed on the player, and this determination is made with reference to the relationship between the opponent character and the viewpoint position of the virtual camera. Furthermore, the CPU 101 also has functions to (i) reduce the life gauge by a prescribed amount when the player receives a punch, and (ii) determine whether the life gauge has fallen to 0.

Figure 5A:
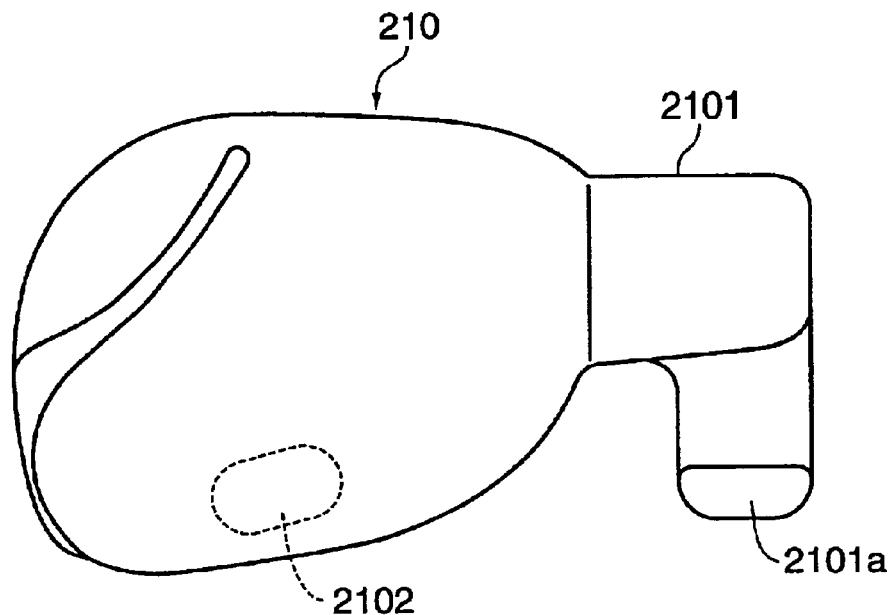
FIG. 5A is a side view.
Figure 5B:
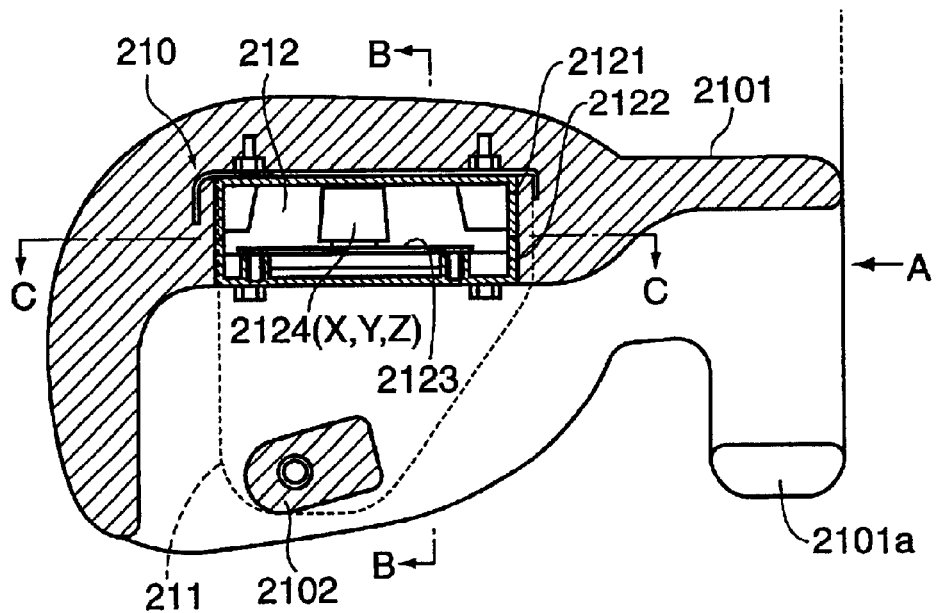
FIG. 5B is a side cross-sectional view.
Figure 6A:
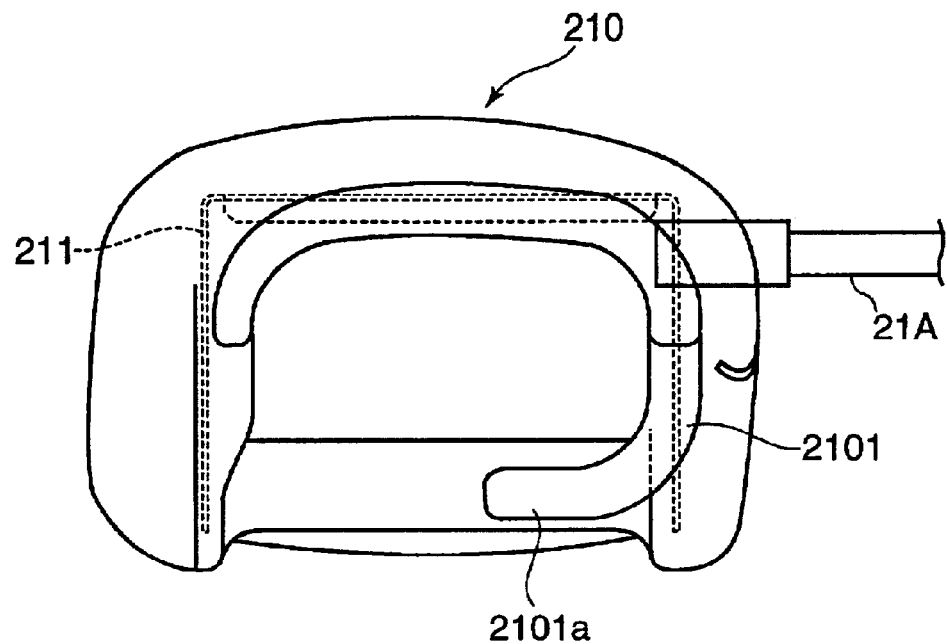
FIG. 6A is a view of FIG. 5A in the direction indicated by the arrow A.

The construction and operation of the glove units 21 and 22 will now be explained with reference to FIGS. 5 through 7, using the left glove unit 21 as an example. FIG. 5A is a side view, FIG. 5B is a side cross-sectional view, FIG. 6A is a view of FIG. 5A from the direction of the arrow A, FIG. 6B is a cross-sectional view of FIG. 5A cut along the B—B line, and FIG. 7 is a cross-sectional view of FIG. 5A cut along the C—C line.

The glove unit 21 is formed from resin or a similar substance, and has the same external configuration as a glove used in a boxing match. The glove unit 21 has a main section 210 in which the hand is inserted, and formed therein is a fixing area 2101 that fixes the player's wrist in the proper position. The main section 210 has side walls of a prescribed thickness at the upper part (the area that comes into contact with the back of the fist), the tip part (the area that comes into contact with the fingers of the fist), and the right and left parts (the areas that come into contact with the thumb and pinky finger) thereof, while the bottom part is open. Located at an appropriate location at the center lower part of the main section 210 is a rod-shaped holding member 2102 that extends across from the right side wall to the left side wall. The fixing area 2101 has a wrapping part 2101a that wraps around the wrist from the bottom thereof, as shown in FIG. 6A, so that the glove 21 will not rotate freely around the holding member 2102 and slip off of the hand.

Figure 6B:
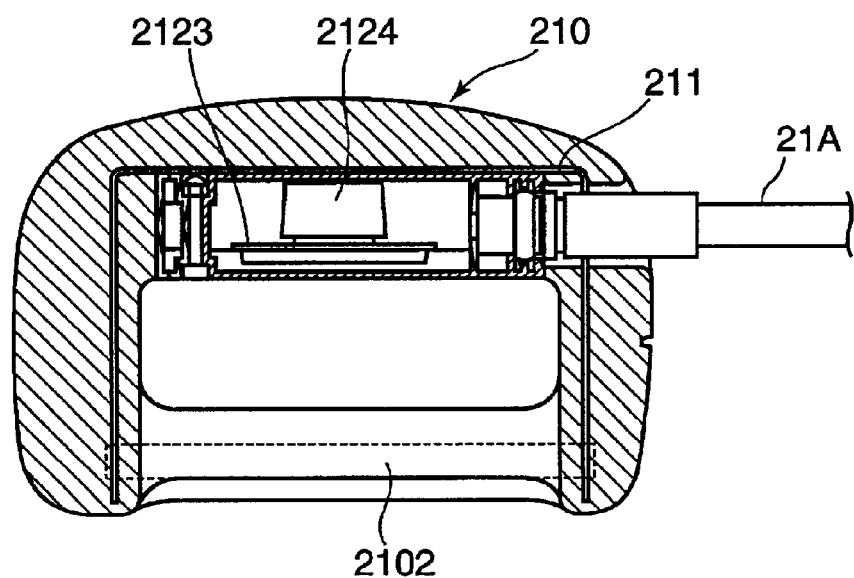
FIG. 6B is a cross-section of FIG. 5A cut along the B—B line.
Figure 7:
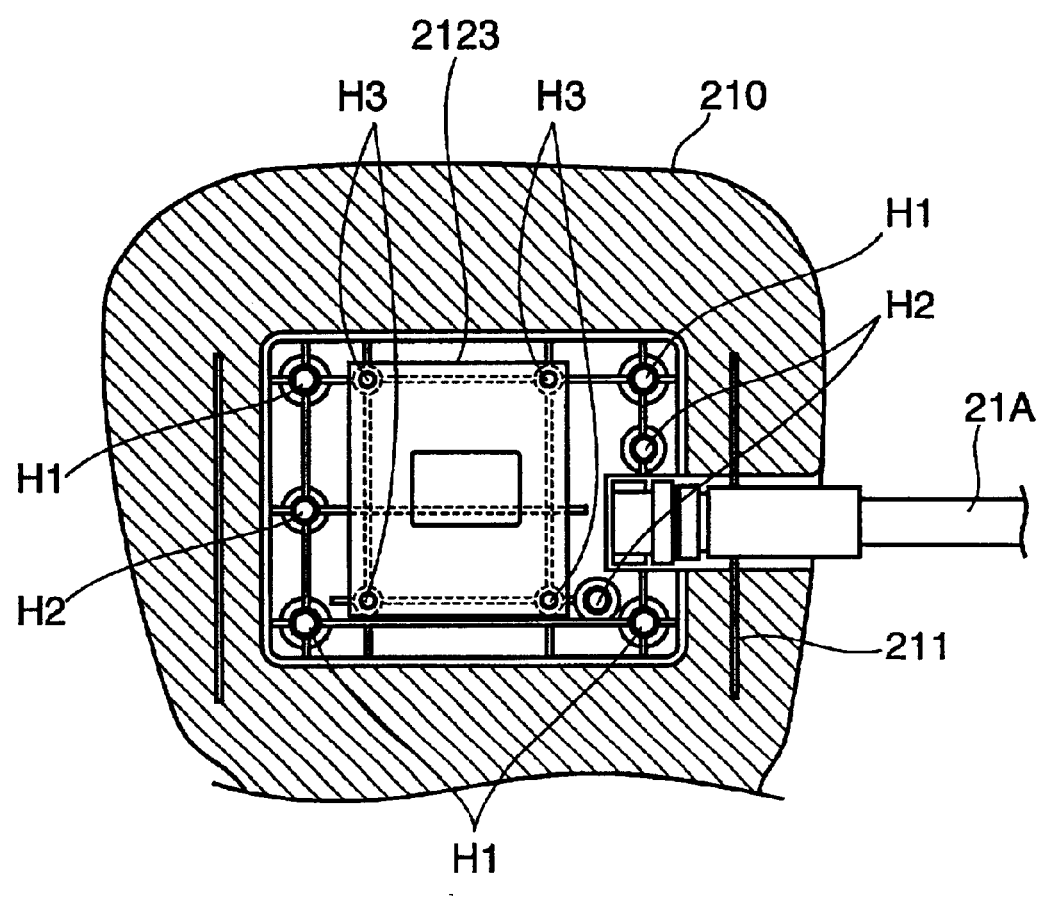
FIG. 7 is a cross-section of FIG. 5A cut along the C—C line.

As shown in FIG. 6B, a plate member 211 comprising a U-shaped metal member having walls at the top and the right and left thereof is embedded in the upper part and the right and left parts of the main section 210. Part of the interior of the top plate forming the plate member 211 comprises an empty space containing no resin, and an acceleration sensor unit 212 is housed in this empty space as a motion detection unit. In other words, the glove unit 21 is formed through the infusion of resin into a mold into which the plate member 211 is already set.

The acceleration sensor unit 212 has upper and lower casings 2121 and 2122 comprising the top and bottom parts of a rectangular parallelepiped box, and inside the acceleration sensor unit 212 is housed a sensor substrate 2123 and a sensor 2124 that is mounted on the sensor substrate 2123. As shown by the bolt holes in FIG. 7, the upper casing 2121 is fixed to the plate member 211 beforehand by screwing nuts to the bolts placed thereon (bolt holes H1), and the lower casing 2122 is fixed to the upper casing 2121 (bolt holes H2) by screws. The sensor substrate 2123 is fixed to the lower casing 2122 (bolt holes H3) by screws. It is also acceptable if a process is adopted in which the upper and lower casings 2121 and 2122 are assembled and then mounted to the plate member 211. Alternatively, a different public-domain method may be used to connect the components together.

The sensor 2124 houses an acceleration sensor that can detect movement components along three axes, and when acceleration occurs, it outputs level voltage for each axial direction component in accordance with the acceleration.

Figure 8:
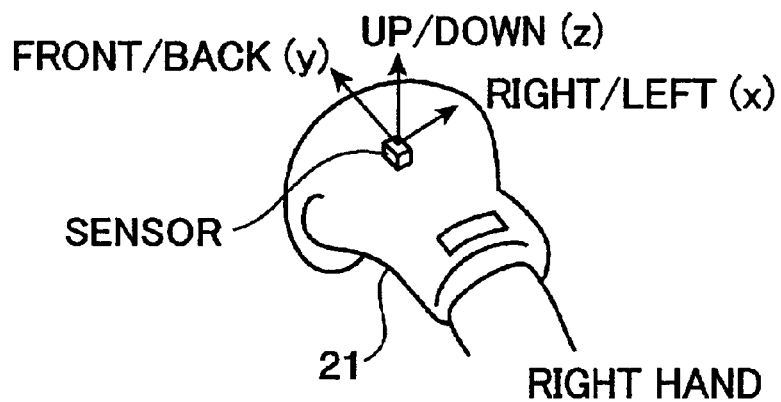
FIG. 8 is a drawing to explain the detection directions for the three-axis acceleration sensor.

This embodiment includes, as shown in FIG. 8, functions equivalent to a sensor Y that individually detects acceleration in the tip direction (front/back direction (y)) of the glove unit 21, a sensor X that individually detects acceleration in the right/left direction (x), and a sensor Z that individually detects acceleration in the up/down direction (z). It is also acceptable if a construction is adopted in which individual acceleration sensors are employed for each axial direction.

Figure 9:
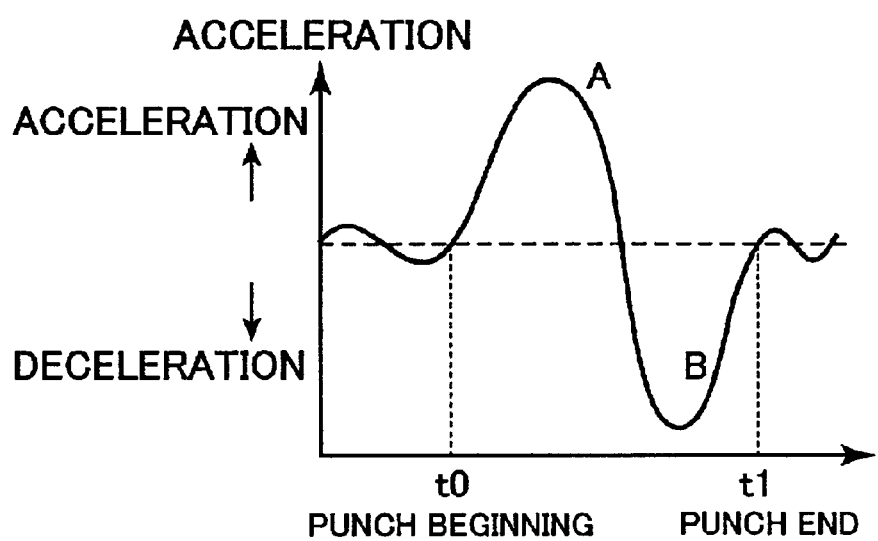
FIG. 9 is a sensor waveform diagram.

FIG. 9 is a waveform graph for the sensor 2124. When a punch occurs, a positive acceleration normally occurs at the beginning of the action (time t0), and after the peak acceleration is reached, the rate of acceleration begins to decrease, changing into negative acceleration at the point at which the arm is completely extended, and finally at time t1, the rate of acceleration returns to 0. Because the arm is generally always in motion to some extent, the beginning of a punch is determined in the manner described below.

The punch determining unit 103 shown in FIG. 3 determines the type of punch from the detection waveforms from the sensors X, Y and Z, and has a memory that at least sequentially stores the waveforms output from the X, Y and Z sensors during the prescribed immediately preceding period of time. The types of punches are a straight punch, a right hook if the glove unit 21 is used (a left hook if the glove unit 22 is used), and an uppercut. The punch determining unit 103 detects the constant acceleration for each sensor X, Y and Z after the game is begun. Here, with regard to the sensor Y, ① where a large value is suddenly input, ② the punch determining unit 103 travels backward on the waveform to detect the point in time at which the value was close to 0, and determines this point to be time t0. ③ Subsequently, after a small value is suddenly obtained, ④ the punch determining unit 103 detects the point in time at which the value was subsequently close to 0, and determines this point to be time t1. Alternatively, a prescribed number of seconds may be set beforehand as the interval t0 to t1.

If the times t0 and t1 are determined in this way, the type of punch is determined through analysis of the waveforms of the sensors X and Z during this interval. While it is acceptable to perform waveform analysis, in view of time restrictions, the following method is preferred. In this method, data such as the maximum and minimum values in the waveform during the t0–t1 interval (a positive value detected immediately before the acceleration turns negative (an extreme value); a detected negative value detected immediately before the acceleration turns positive (an extreme value)), the waveform amplitude (the difference between the maximum and minimum values above), the number of waveform peaks (the number of extreme values), and the waveform integral value (the total of the detected values at each detection time) are extracted from outputs from the sensors X, Y and Z, and the type of punch is determined from these various items of data.

Figure 10A:
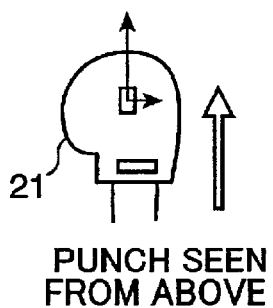
FIG. 10A shows a straight punch.
Figure 10B:
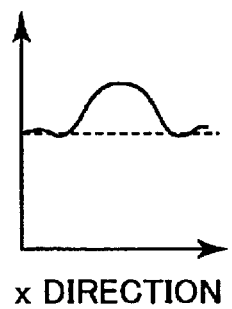
FIG. 10B shows the detection waveform for the sensor X, an FIG. 10C shows the detection waveform for the sensor Z.
Figure 10C:
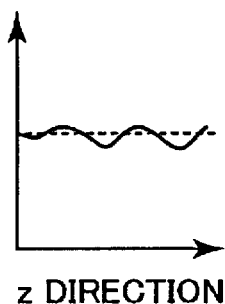

FIGS. 10 through 12 show the relationship between the type of punch and the waveform output from each sensor X, Y and Z. FIG. 10 shows a straight punch, as shown in FIG. 10A. Here, the sensor Y exhibits the waveform shown in FIG. 9, the sensor X exhibits a waveform in which some positive acceleration occurs due to the fact that the punch travels some distance sideways from the player's body, as shown in FIG. 10B, and as shown in FIG. 10C, the sensor Z exhibits a waveform with essentially no change in output because there is no real change in acceleration in a vertical direction.

Figure 11A:
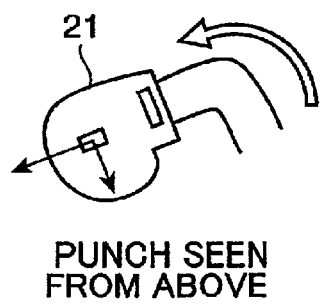
FIG. 11A shows a hook.
Figure 11B:
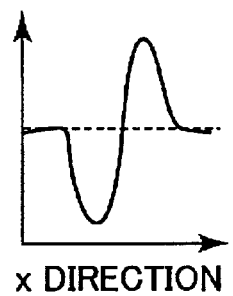
FIG. 11B shows the detection waveform for the sensor X, an FIG. 11C shows the detection waveform for the sensor Z.
Figure 11C:
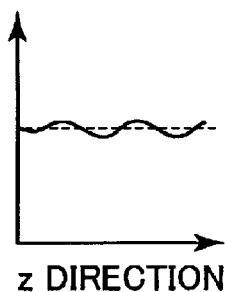

FIG. 11 shows a right hook, as shown in FIG. 11A. Here, the sensor Y exhibits the same basic waveform as shown in FIG. 9, while the sensor X exhibits a waveform in which, because the fist moves as if it were swallowed by the inside of the opponent character's body, acceleration toward the inside direction (negative acceleration in terms of the right/left direction x) occurs when the action is begun, after which positive acceleration occurs, as shown in FIG. 11B. As shown in FIG. 11C, the sensor Z exhibits a waveform with essentially no change in output because there is no real change in acceleration in a vertical direction.

Figure 12A:
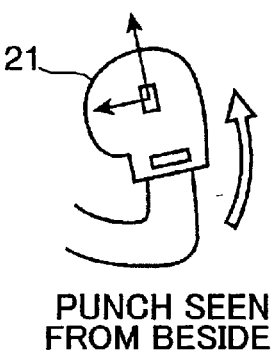
FIG. 12A shows an uppercut.
Figure 12B:
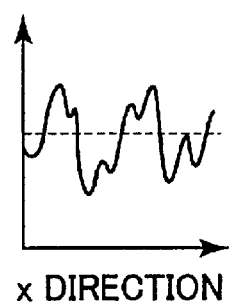
FIG. 12B shows the detection waveform for the sensor X, an FIG. 12C shows the detection waveform for the sensor Z.
Figure 12C:
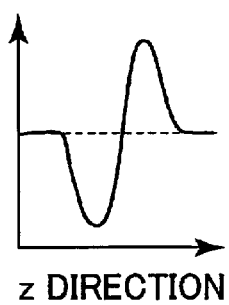

FIG. 12 shows an uppercut, as shown in FIG. 12A. Here, the sensor Y exhibits the same basic waveform as shown in FIG. 9, but because the punch traces a circular arc when it is thrown, as in the case of a hook, but unlike a hook, the palm of the hand faces the front of the player and the punch is thrown, the sensor X exhibits a waveform in which large negative acceleration first occurs in the z direction, whereupon positive acceleration occurs, as shown in FIG. 12C. With regard to the sensor Z, acceleration in the right/left direction is unstable, and thus the waveform is rather shapeless, as shown in FIG. 12B.

The punch determining unit 103 determines the type of punch by converting the waveform patterns shown in FIG. 9 and FIGS. 10 through 12 into the data for the maximum and minimum values, the waveform amplitude, the number of waveform peaks, the waveform integral values, etc. The result of this determination is supplied to the game controller 100.

Figure 4:
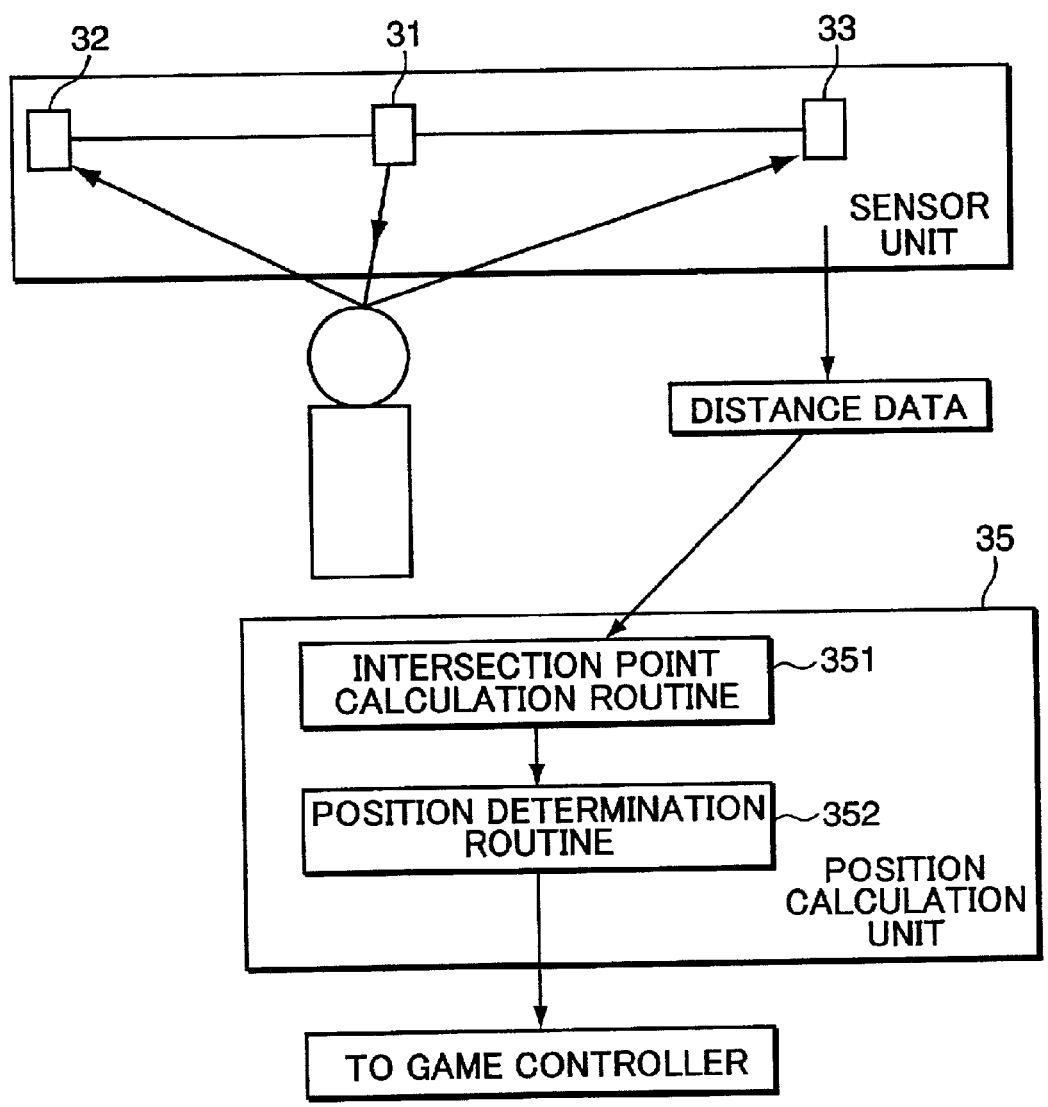
FIG. 4 is a block diagram showing the detection principle used by the position calculation unit of the head detection unit.

Next, the detection principle employed by the position calculation unit 35 of the head detection unit 30 will be explained with reference to FIG. 4. Wide-angle directional ultrasonic pulses transmitted by the ultrasonic transmitter 31 are reflected off the player's body located below the transmitter, and some of these pulses are received by the ultrasonic receivers 32 and 33. Because during normal play, the player's head is the highest part of his or her body, the pulse signals received by the receivers 32 and 33 may be deemed as returning signals reflected off the head of the player. The position calculation unit 35 (i) clocks, for each ultrasonic receiver 32 and 33, the time elapsed between the time the pulse is sent and the time that the pulse signal received by the ultrasonic receiver rises, (ii) performs various geometric calculation processes using the distance data obtained through conversion of both clocked times based on the atmospheric propagation sound velocity, as well as information regarding the distances between the ultrasonic transmitter 31 and the ultrasonic receivers 32 and 33, and regarding their height, and (iii) calculates the position of the player's head in the vertical direction and in the right/left direction. In other words, the clocked time for the ultrasonic receiver 32 determines an ellipsis with the ultrasonic transmitter 31 and the ultrasonic receiver 32 as foci. Similarly, the clocked time for the ultrasonic receiver 33 determines a separate ellipsis with the ultrasonic transmitter 31 and the ultrasonic receiver 33 as foci. Because the position of the ultrasonic transmitter 31 is the same in either case, the point of intersection comprising the lowest point of the two ellipsoids can be calculated (intersection point calculation process 351), and the position in space in both the vertical direction and the right/left direction can be determined from the height information for the ultrasonic transmitter 31 and the ultrasonic receivers 32 and 33 (position determination process 352). In order to simplify this calculation, the player's head may be deemed to be directly below the ultrasonic transmitter 31 and the ultrasonic receivers 32 and 33, i.e., the intersection point may be calculated using only ellipsis calculation. Furthermore, a construction may be adopted in which the relationship between the two clocked times (i.e., the two items of distance data) and the head position are calculated beforehand and sought, and thereafter stored in the form of a reference table (LUT). The position calculation unit 35 transmits the height position and the right/left position of the player's head within the empty space to the game controller 100 as virtual camera viewpoint information, and also transmits them to the draw controller 110. Therefore, the viewpoint of the virtual camera is shifted in accordance with the position of the player's head, i.e., so as to track the amount and direction of the change in the position of the player's head.

Figure 13:
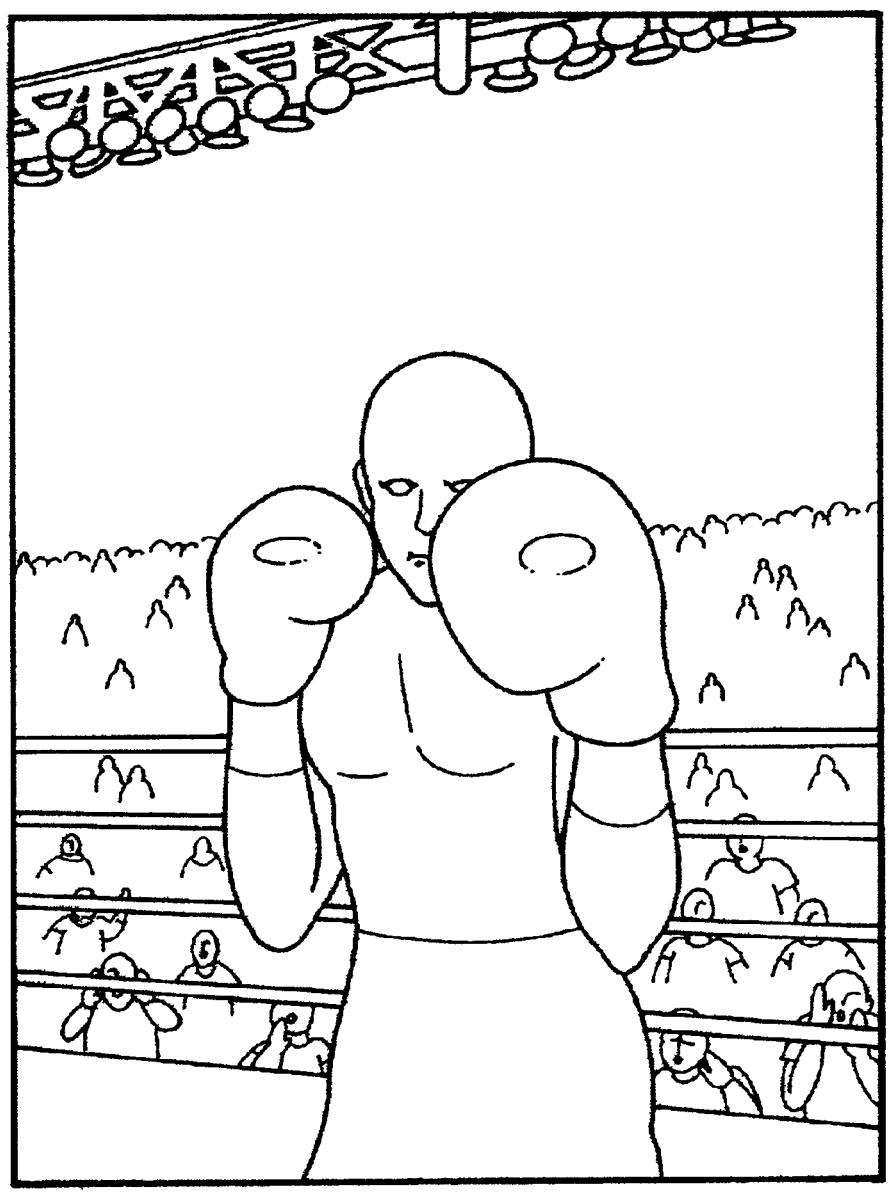
FIG. 13 is a screen view showing the opponent character taking a normal pose as a fighting pose.
Figure 14:
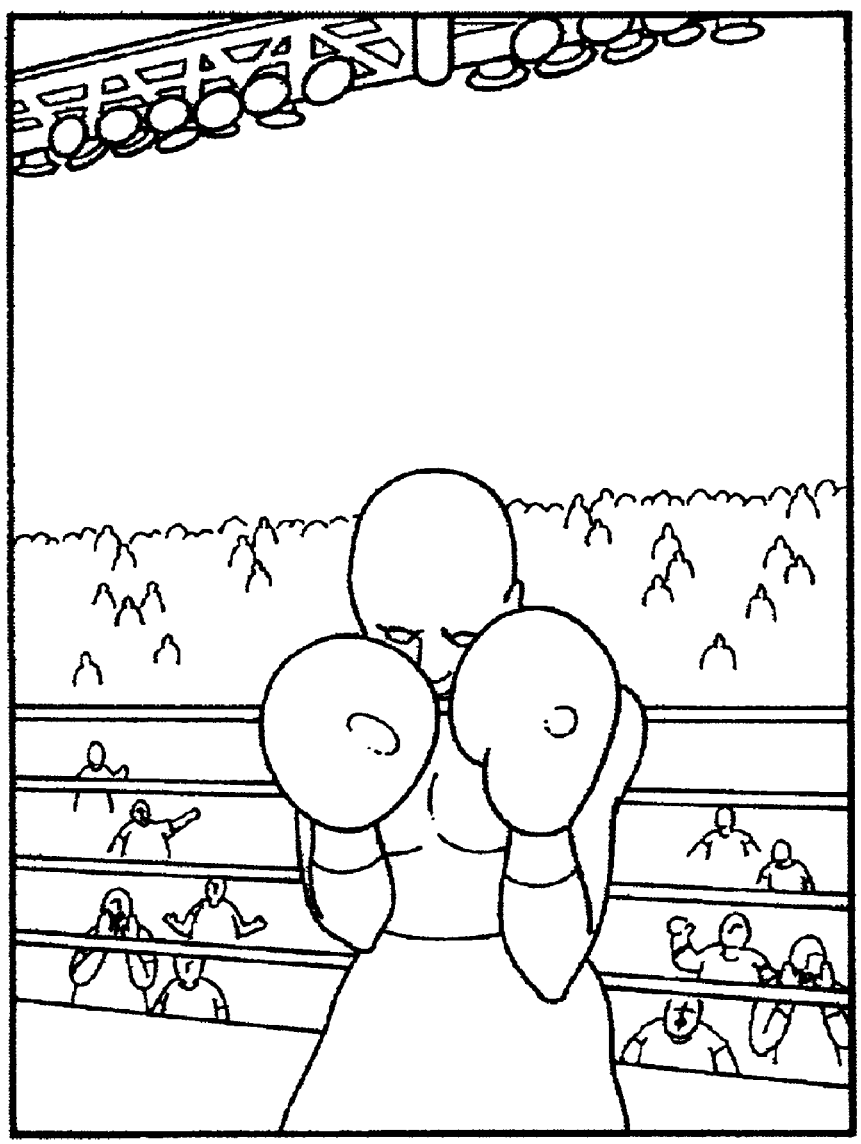
FIG. 14 is a screen view showing the opponent character taking a pose offering no opening.
Figure 15:
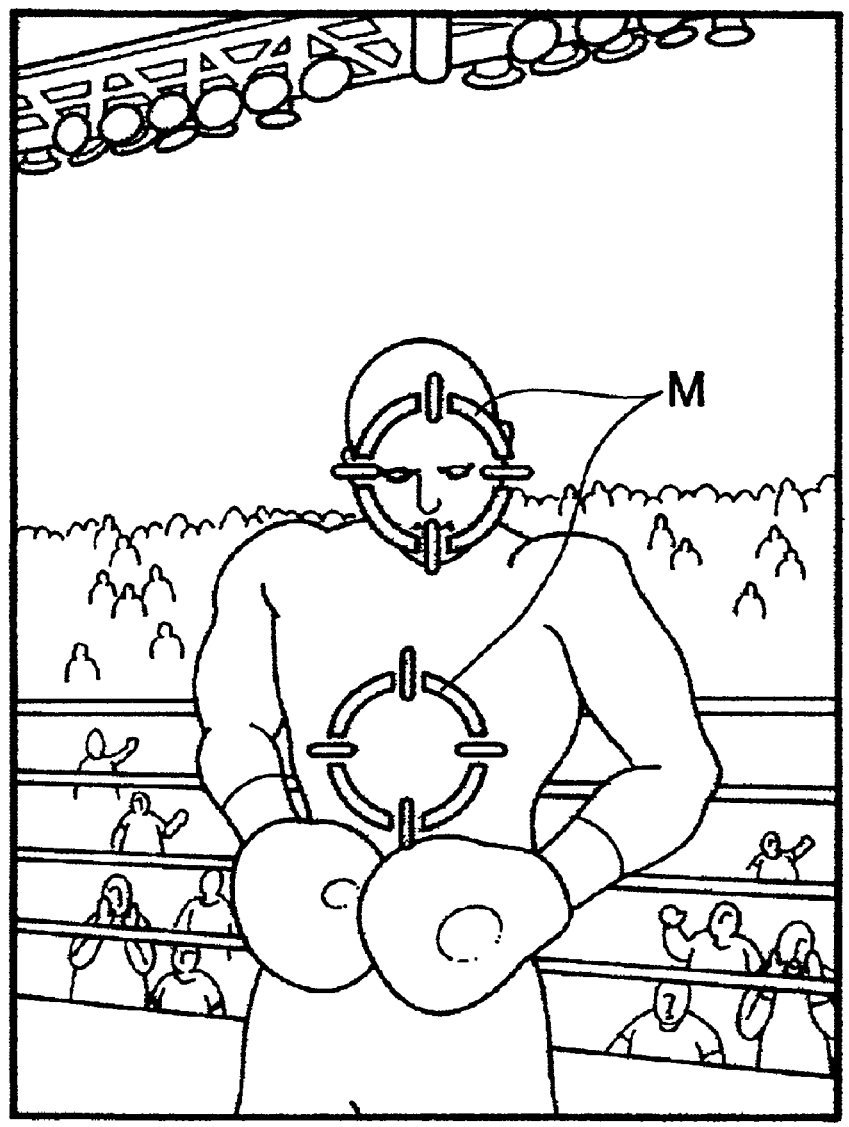
FIG. 15 is a screen view showing the opponent character adopting a pose in which he is engaged in his habit of pulling up his trunks.
Figure 16:
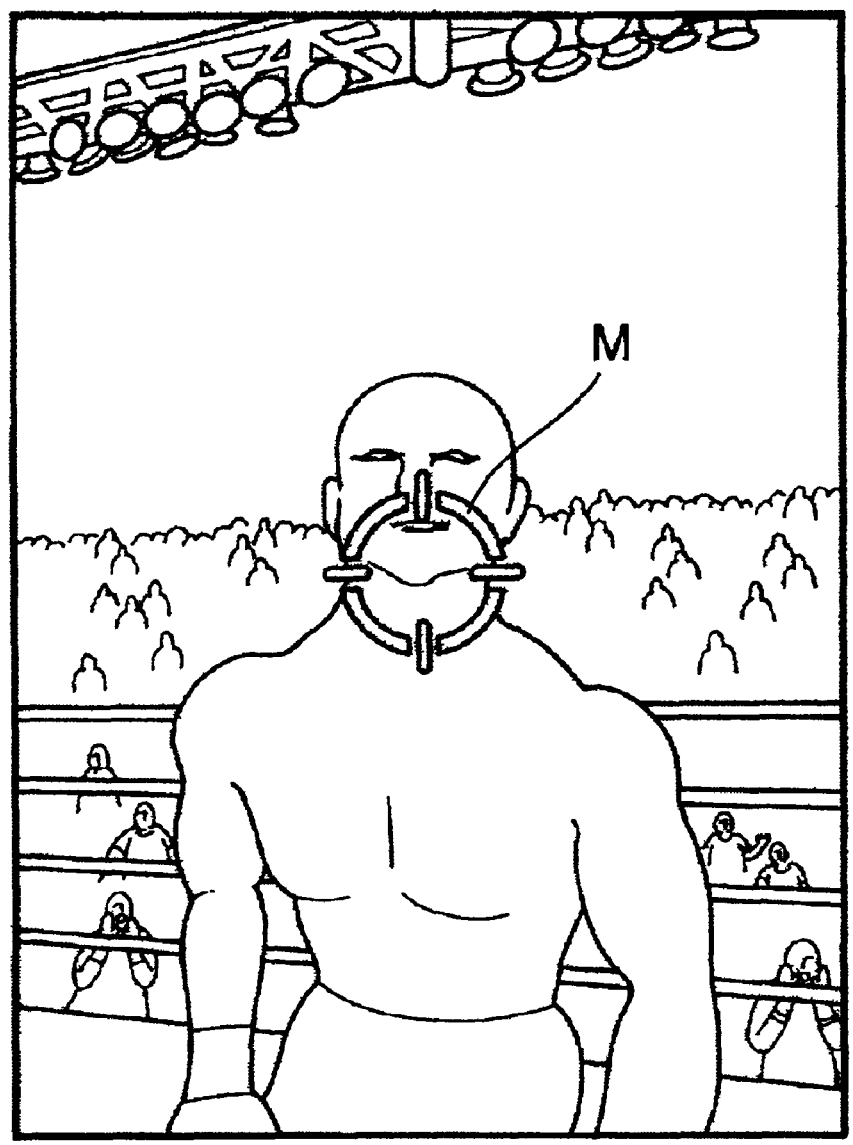
FIG. 16 is a screen view showing the opponent character adopting a defiant pose in which the chin is thrust outward.
Figure 17:
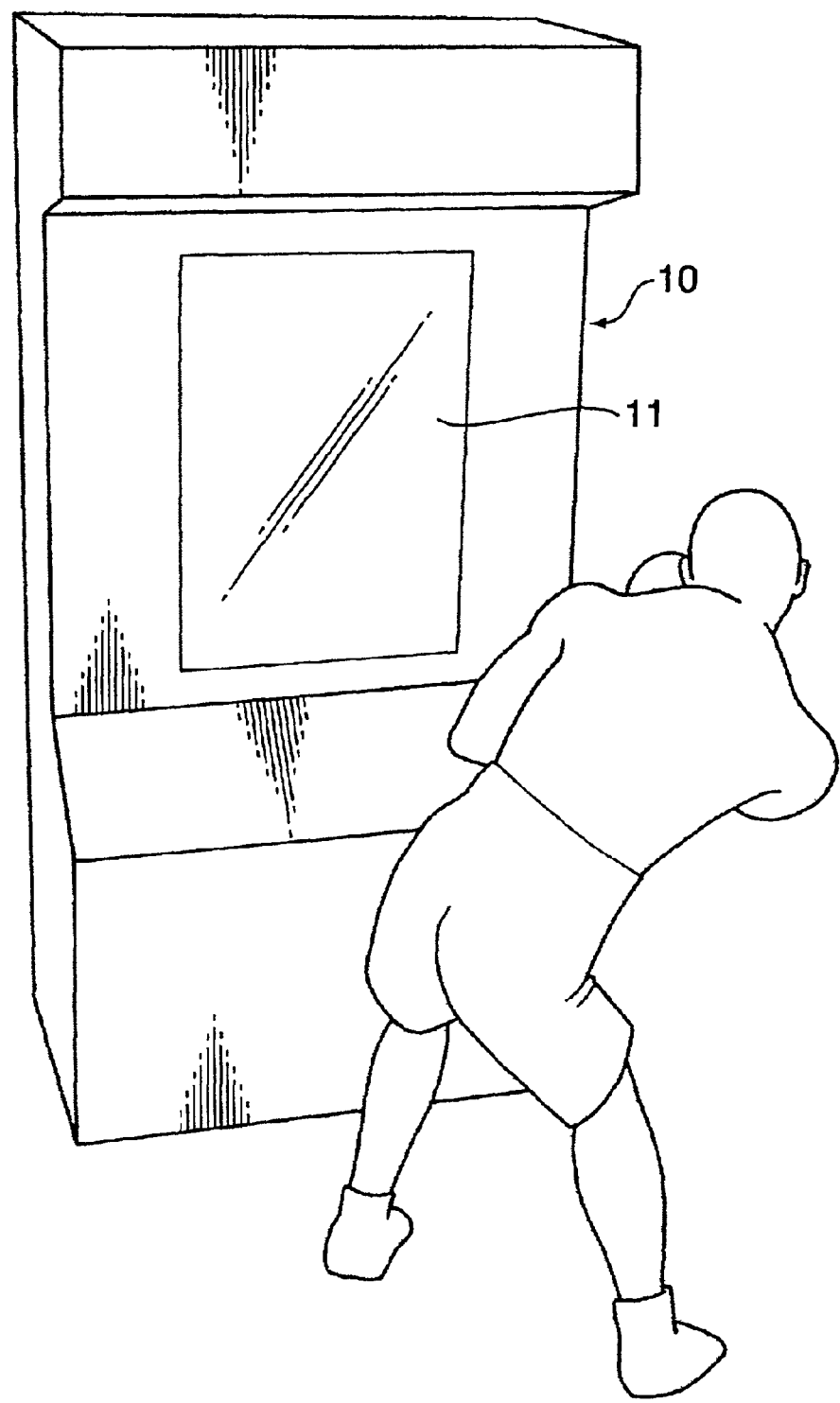
FIG. 17 is an image drawing showing the movement by which the player avoids a punch.

Returning to FIG. 3, the game controller 100 (i) transmits to the draw controller 110 instructions to have the opponent character displayed on the screen of monitor 11 adopt various fighting poses (a normal pose as a fighting pose, as shown in FIG. 13, a pose that offers no opening, as shown in FIG. 14, a pose in which the opponent is engaged in his habit of pulling up his trunks, as shown in FIG. 15, and a provoking pose in which the opponent thrusts out his chin, as shown in FIG. 16), as well as to have the opponent throw punches either randomly or according to prescribed rules, and (ii) determines using the determining function unit whether when the punch is thrown a virtual camera viewpoint exists in that direction, and if such a viewpoint does exist, instructs the draw controller 110 to execute the hit effect routine to reflect that the punch landed on the player. Furthermore, when the player has moved his or her body to the left or right or up and down, as shown in the image drawing of FIG. 17, i.e. when it is determined by the head detection unit 30 that the player's head has moved away from the front of the screen of the monitor 11 by an amount equal to or more than a prescribed distance, as the opponent character threw the punch, the punch is processed as having missed, and as a result the player can enjoy the sensation of having slipped the opponent character's punch.

Figure 19B:
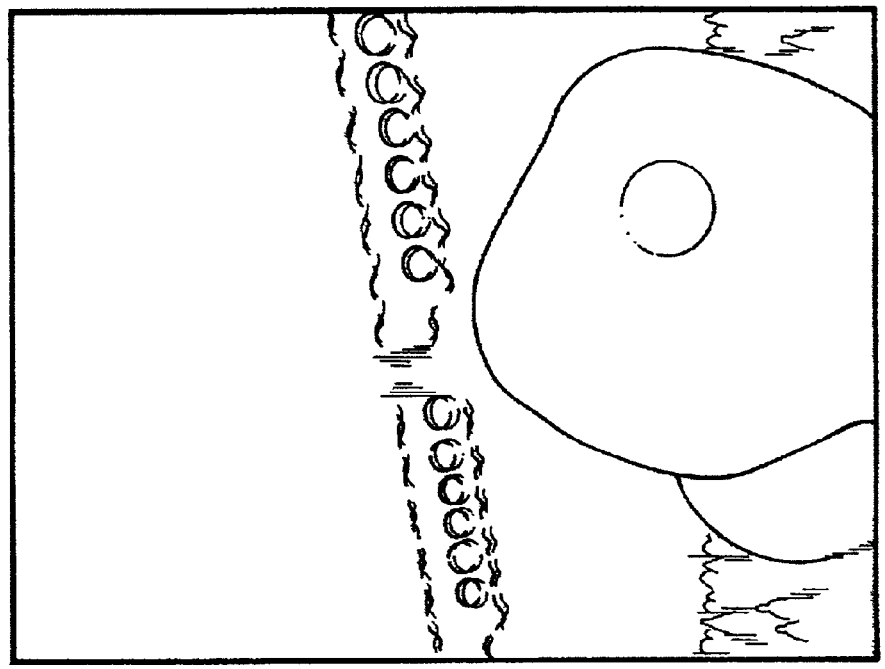
FIG. 19B is a screen drawing in which the viewpoint moves upward while shaking.
Figure 19A:
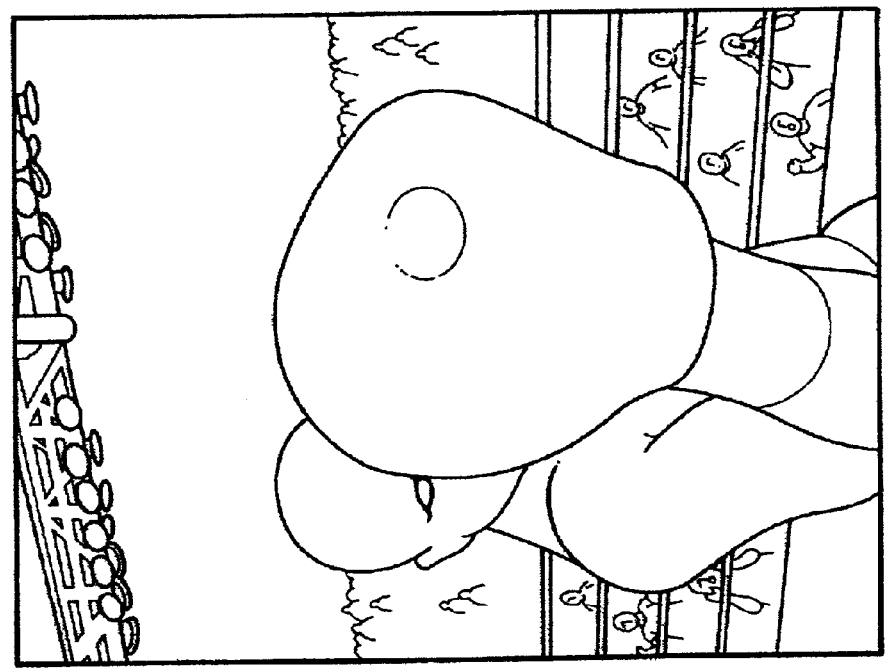

In addition, when it receives an instruction for a hit effect routine from the game controller 100, the draw controller 110 changes the address of the RAM 111 from which the image is read so that the displayed image on the screen of the monitor 11, i.e., the entire screen image, will shake along at least one axis, such as in the right/left direction, for some number of seconds, such as one second. For example, when the opponent character's punch is received from the right, as shown in FIG. 18A, the viewpoint moves to the left while shaking, as shown in FIG. 18B. Similarly, when a rising punch is received from the opponent character, as shown in FIG. 19A, the viewpoint moves upward while shaking, as shown in FIG. 19B, creating the sensation via the shaking screen image that a punch was landed.

Furthermore, the game controller 100 sets multiple locations on the opponent character's body, for example, the chin and body, as hitting areas, and the parts of the opponent character's body that, from the virtual camera's viewpoint, overlap with (are covered by) the opponent character's hands (as a practical matter, this may include the character's gloves, as well as the region within a prescribed radius of the center of each glove), as defensive regions. During the time that a defensive region is located away from a hitting area, the game controller 100 instructs the draw controller 110 to display a hitting mark 'M', either on its own or together with a point value, on the uncovered hitting area, as shown in FIG. 20C. FIGS. 20A through 20C show the opponent character throwing a punch, and providing an opening to the body when the punch was avoided by the player. In addition, the player may create an opening on the opponent character by moving his or her head, i.e., by changing the viewpoint of the virtual camera. Moreover, the defensive regions may be set to be related to the opponent character's arms.

At the same time, when the game controller 100 receives an operation signal comprising a throw punch signal from the glove unit 21 or 22, it instructs the execution of a hit effect routine to reflect that the punch landed on the opponent character displayed on the screen of the monitor 11. This hit effect routine displays damage to the opponent character displayed on the screen of the monitor 11. For example, the game controller 100 recognizes whether the operation signal is an operation signal based on a hook thrown using the right or left glove unit 21 or 22, and if the operation signal is from the side of the right glove unit 21, as a damage operation, the game controller 100 instructs the draw controller 110 for that side to display on the screen of the monitor 11 the opponent character leaning or swaying to the left, as shown in the screen drawing of FIG. 21A and the image drawing of FIG. 21B, while if the operation signal is from the side of the left glove unit 22, the game controller 100 instructs the draw controller 110 as a damage operation for that side to display on the screen of the monitor 11 the upper body of the opponent character leaning to the right.

Figure 23A:
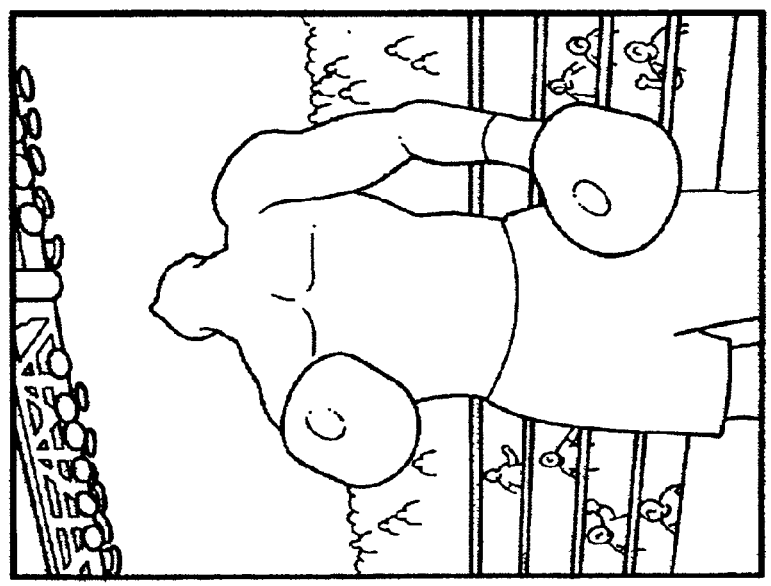
FIG. 23A is a screen drawing showing the receipt of an uppercut.
Figure 23B:
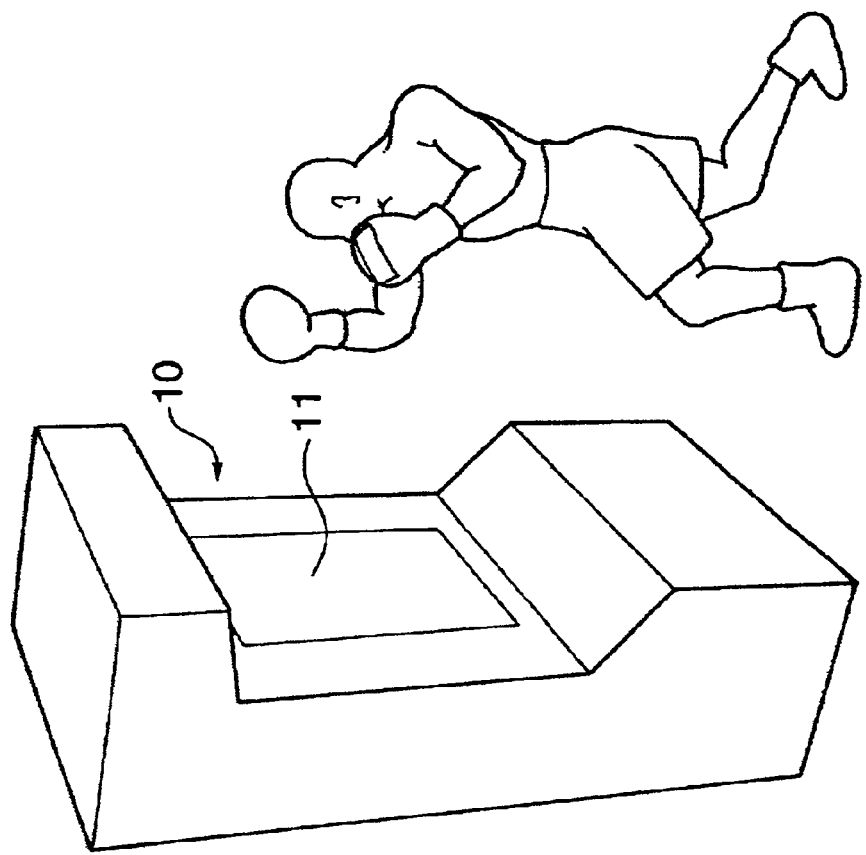
FIG. 23B is an image drawing showing the throwing of the punch.

When the type of punch is a straight punch, the draw controller 110 is instructed to have the opponent character lean or sway away from the screen, as shown in the screen drawing of FIG. 22A and the image drawing of FIG. 22B. When the type of punch is an uppercut, the draw controller 110 is instructed to have the opponent character float upward in the screen, as shown in the screen drawing of FIG. 23A and the image drawing of FIG. 23B.

Figure 24:
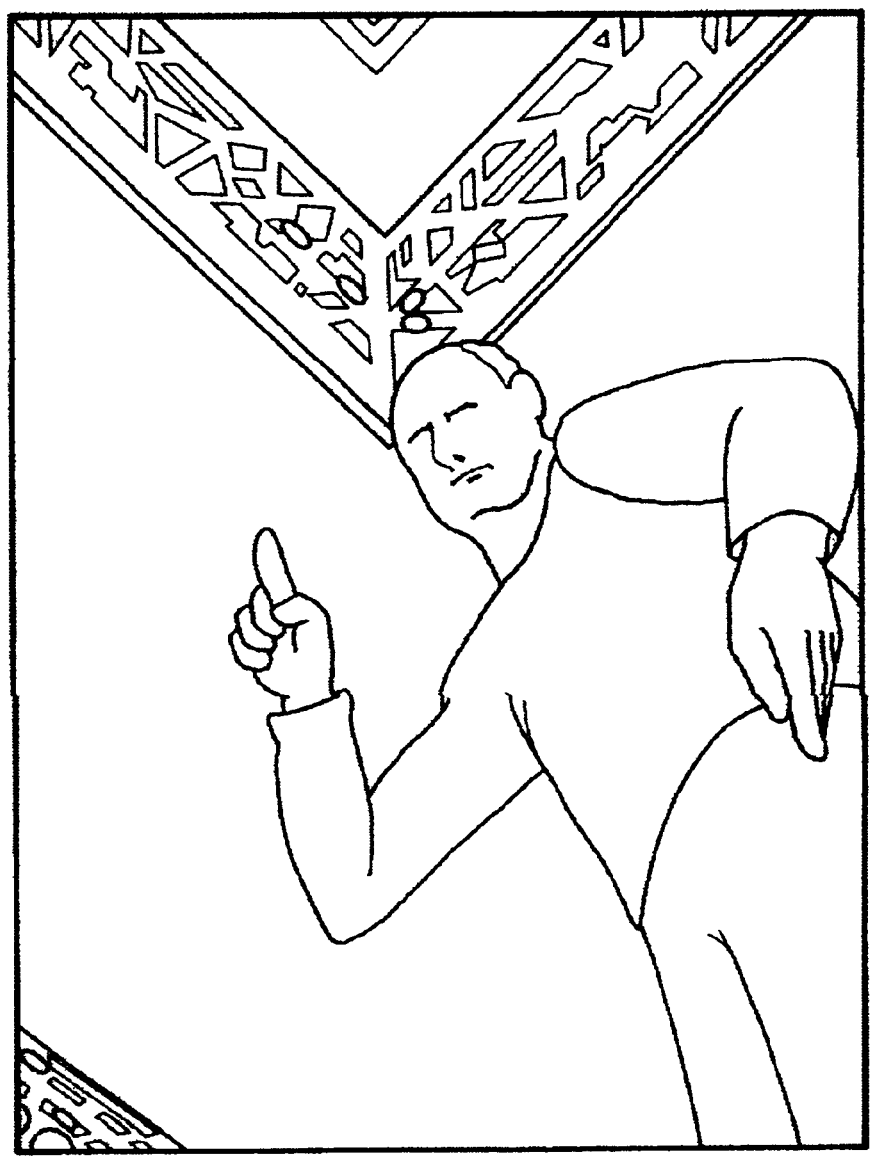
FIG. 24 is a screen drawing showing the screen that appears when the player is knocked down.

Furthermore, the type of punch needed to trigger a hit effect routine is associated beforehand with the hitting position. When a determination signal is received from the punch determining unit 103, and if the hitting occurred at the chin, the punch is determined to be an uppercut, and if the hitting occurred at the body, the punch is determined to be a straight punch or a hook, while in other cases, the game controller 100 issues an instruction to perform an effect display to have the opponent character shake only to the extent needed to reflect that a hit was landed that inflicted little damage. When a hitting mark M is being displayed, if a type of punch that is associated with the hitting mark M is thrown, processing is executed to reduce the life energy of the opponent character by the point value shown in the hitting mark M, for example. Life energy is set to be the same for the opponent character and the player, and points are deducted each time a punch is received. Each combatant's life energy is displayed at an appropriate visible location on the monitor 11 in the form of a life gauge that is not shown in the drawings. When one person's life energy reaches the level of zero, for example, the game ends. When the opponent character's life energy reaches zero due to the player's punches, a knockout image is displayed, and the game ends with the player deemed the winner, while if the reverse situation occurs, the 'Down' screen shown in FIG. 24 is displayed, and if the player fails to rise within a ten-count, the game ends with the player deemed the loser. Where neither person's life energy reaches zero level, the game ends upon the expiration of a prescribed period of time, and the person having the higher remaining life energy level at the end of the game is deemed the winner.

Figure 25:
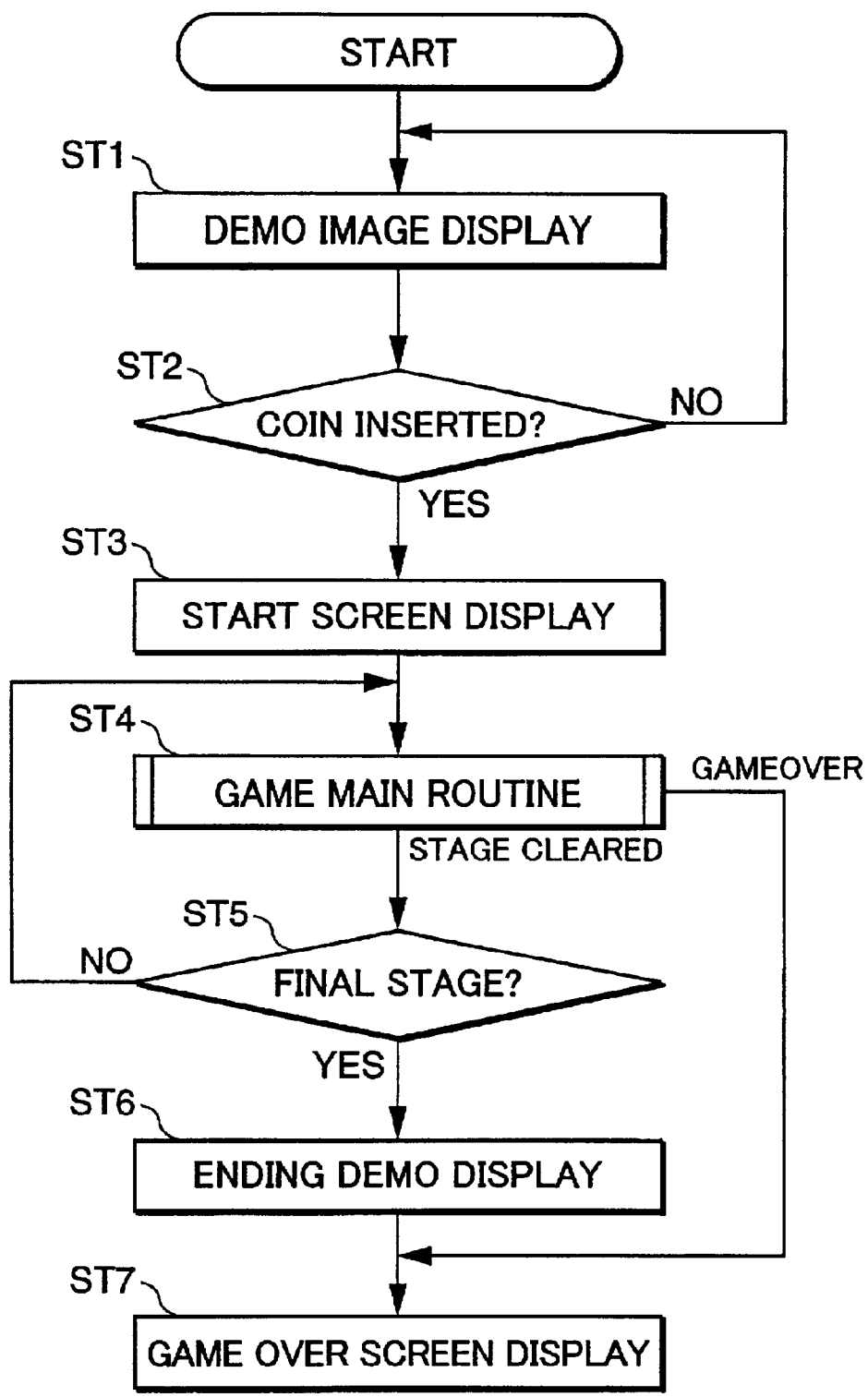
FIG. 25 is a flow chart showing one example of the game action routine executed by the CPU.

FIG. 25 is a flow chart showing an example of the game action routines executed by the CPU 101. When the power is turned ON, the sequence begins. First, the demonstration screen is displayed on the monitor 11 (step ST1). If it is detected by the coin switch 25a that a prescribed coin has been inserted, (YES in step ST2), the start screen is displayed (step ST3), and the game main routine is executed as a boxing game (step ST4). Where the game is designed to comprise a prescribed number of stages, it is determined whether or not prescribed conditions have not been fulfilled during each stage, i.e., it is determined, for example, whether or not the life gauge displayed on the monitor 11 through the control of the CPU 101 that functions as a life gauge managing means has fallen to a prescribed level, such as zero, and if the opponent character is knocked out during the current stage before the life gauge hits zero, it is determined whether or not the next stage is the final stage (step ST5). Conversely, where the life gauge falls to zero during the game, the display switches to the game over screen at that point, and the game is ended.

On the other hand, if a cleared stage (ending with the player deemed the winner) is the final stage, an ending demo screen representing a victory ceremony is displayed (step ST6), the number of points scored is displayed if necessary, the display is changed to the game over screen (step ST7), and the game ends.

Figure 26:
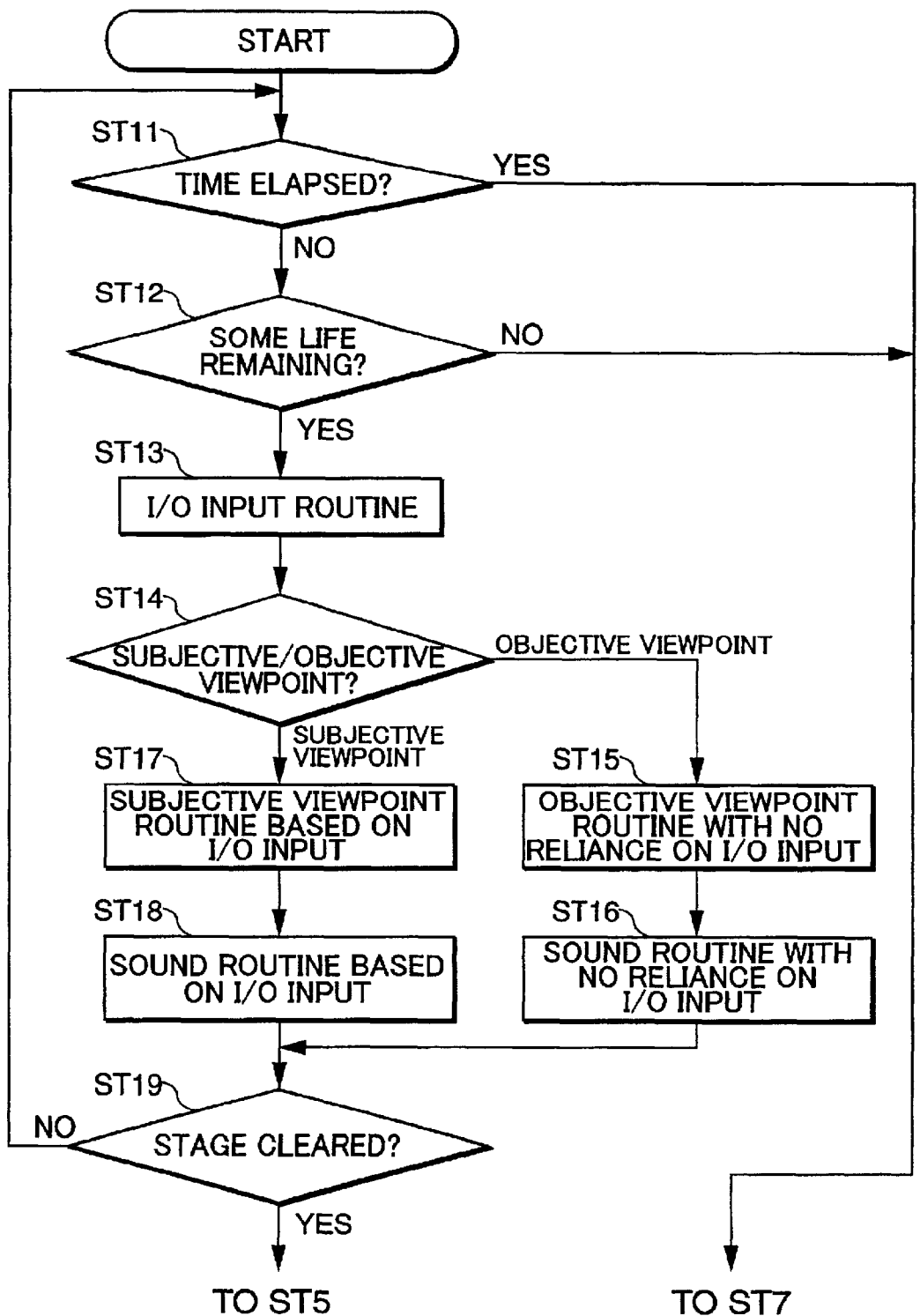
FIG. 26 is a flow chart showing the 'game main unit routine' of step ST4.

FIG. 26 is a flow chart showing the sequence of the 'game main routine' of step ST4. In the game main routine, first, it is determined using an internal timer whether or not the game time set for each stage has elapsed, and if it has not elapsed, it is determined whether or not some life energy remains in the life gauge (steps ST11, ST12). If neither is the case, the CPU 101 shifts to step ST7. On the other hand, if there is some life energy remaining in the life gauge, the I/O input routine, i.e., the routine to receive from the head detection unit 30 information on the position of the player's head, that is, essentially information on the position of the player's eyes, is executed (step ST13).

It is next determined whether or not the viewpoint is a subjective viewpoint or an objective viewpoint (step ST14). In this game, using a timer together with the CPU 101 that functions as a subjective/objective viewpoint switching means, an image of a large scope of view, which is obtained by zooming back the virtual camera to include the player character in the image, is drawn for a certain period of time when each stage begins in order for the player to understand the overall situation regarding the game space, i.e., to understand or recognize where he or she is situated within the game space, and during this period of time, the objective viewpoint routine is carried out. When the draw routine based on this objective viewpoint is completed, the viewpoint switches to the subjective viewpoint using the player's eyes as the standard. In step ST14, if the viewpoint is the objective viewpoint, game action from a viewpoint that does not depend on information obtained in the I/O input routine is drawn together with game images based on this action (step ST15), interrupts for sound control to provide audience noise, etc., occur, and sounds such as cheering are output from the speakers 12 (or both the speakers 12 and the speaker 23)(step ST16).

On the other hand, when the viewpoint is switched to the subjective viewpoint, game action from a subjective viewpoint based on information obtained in the I/O input routine is drawn together with game images based on this action (step ST17), interrupts for sound effects to provide sounds resembling the swishing of air from the throwing of punches and the sounds of punches landing occur, and the sounds are output from the speaker 23 (step ST18). When the sound routines of steps ST16 and ST18 are completed, it is determined whether or not the current stage has ended, and if it has not ended, the CPU 101 shifts to step ST11 and the sequence from step ST11 to step ST18 is repeated, while if the current stage has ended, the CPU 101 shifts returns to step ST6 and this sequence is no longer followed.

Figure 27:
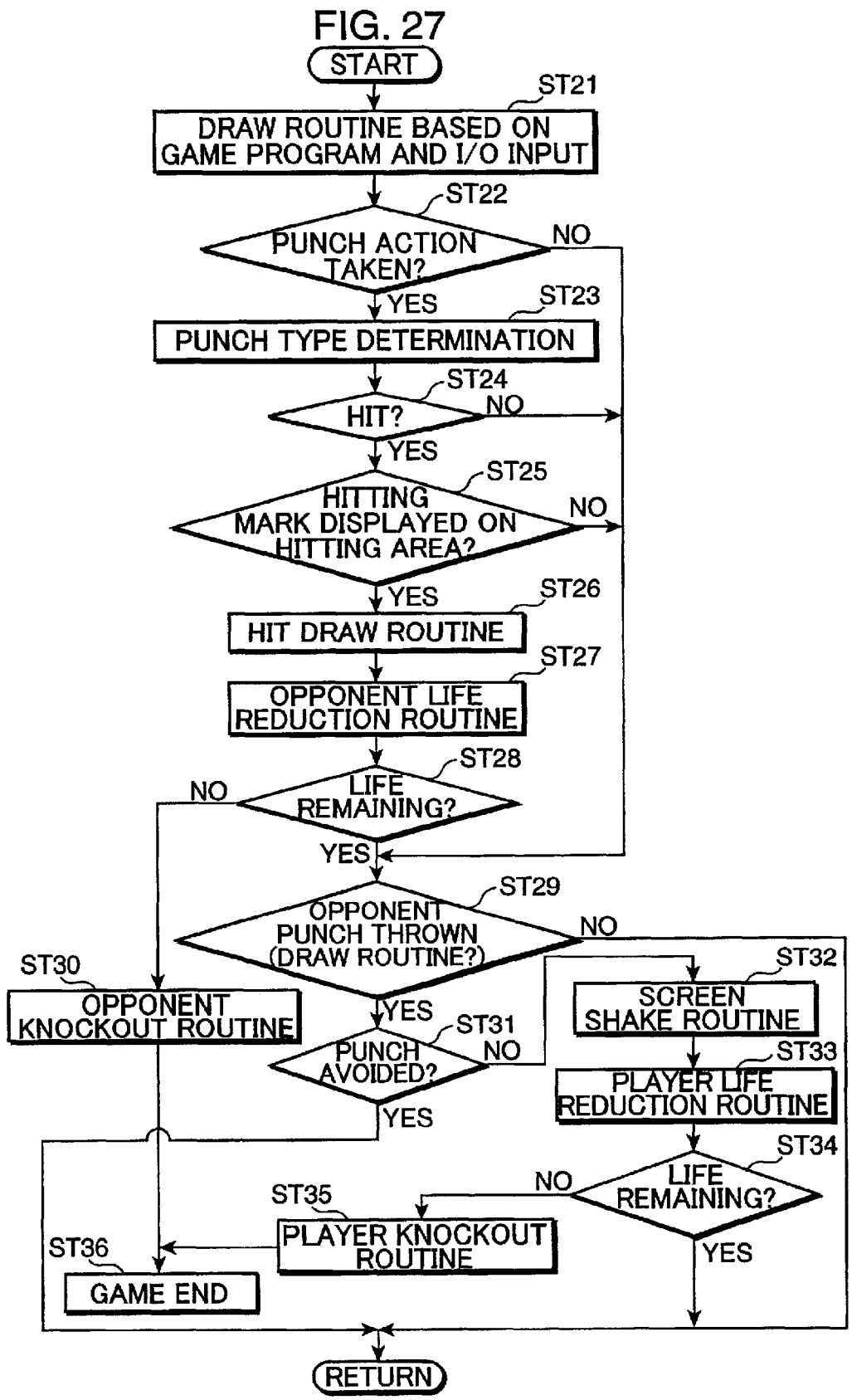
FIG. 27 is a flow chart showing the 'subjective viewpoint routine based on I/O input' of step ST17.

FIG. 27 is a flow chart of the 'subjective viewpoint based on I/O input routine' of step ST17. First, a draw routine based on the game program and I/O input is executed (step ST21). Next, it is determined whether or not the player has thrown a punch (step ST22), and if a punch was thrown, the result of determination of the type of punch is obtained (step ST23). Here, it is determined whether or not the punch connected (step ST24), and if it did connect, it is determined whether a hitting mark M was displayed at the area where the punch landed (step ST25). If the answer is in the affirmative, the hit effect routine is instructed to indicate a valid hit (step ST26). The life energy reduction routine is then executed for the opponent character (step ST27), and it is determined whether or not any life energy remains (step ST28). If there is life energy remaining, the CPU 101 advances to step ST29, while if there is no life energy remaining, the CPU 101 advances to step ST30, an instruction to perform a knockout display for the opponent character is issued and the game is ended (step ST36).

If the determination result in steps ST22, ST24 and ST25 is NO, the CPU 101 advances to step ST29. If the determination result in step ST25 is NO, a draw instruction for the simple hit effect routine described above is issued.

In step ST29, it is determined whether or not the opponent character has thrown a punch, and if it has, it is determined whether or not the punch was avoided (step ST31). If the punch was avoided, the CPU 101 returns to the start without performing further processing, while if the punch connected, an instruction to execute the screen shake routine is issued (step ST32), and the amount of life energy belonging to the player is reduced by a prescribed amount (step ST33). It is then determined whether or not the player has any life energy remaining (step ST34), and if he does, the CPU 101 returns to the start without performing further processing, while if the player has no life energy remaining, an instruction to perform the knockout display for the player is issued (step ST35) and the game is ended (step ST36). If it is determined in step ST29 that the opponent character has not thrown a punch, the CPU 101 returns to the start without performing further processing.

In the above explanation, the knockout routine is executed at the instant that the life energy level for either combatant falls to zero, but it is also acceptable if the 'Down' routine is executed when the life energy hits zero, and, as in a real boxing match, in each stage (equivalent to a round), either combatant can be knocked down up to twice, and can get back on his or her feet until the expiration of a ten-count (during which time the life energy level is reset to the initial value).

The motion detection unit located in each glove unit 21 and 22 is not limited to an acceleration sensor, and the following constructions may be adopted instead.

(1) A construction may be adopted in which a three-axis acceleration sensor as well as an infrared photoemitting element having a required directional width is mounted inside each glove unit 21 and 22, and at the same time, wide directional width infrared photoreceptor elements are mounted to several locations on the game machine main unit 10, such as the front, diagonally across therefrom, and the top, so that when a punch is thrown, the loci of glove movement are detected with even higher precision by not only receiving the output from the acceleration sensor, but also by adding to the determination of the type of punch the results of the determination of which photoreceptor element received light, or of from which photoreceptor element to which photoreceptor element the received light moves. This would be particularly useful for determining an uppercut.

(2) A construction may be adopted in which (i) a magnetic field generating device is mounted in the game machine main unit 10, and (ii) a magnetic sensor is incorporated in each glove unit 21 and 22, so that the positions and loci of the glove units 21 and 22 are calculated through detection of the strength of the magnetic field.

(3) A construction may be adopted in which (i) multiple ultrasonic sensors are located on the front of the game machine main unit 10 such that their receiving sides face forward, and (ii) an ultrasonic emitter is mounted in each glove unit 21 and 22, so that the positions of the glove units 21 and 22 are detected through the receipt by the game machine main unit 10 of the ultrasonic signals emitted from the glove units 21 and 22, and the loci of the glove units 21 and 22 are calculated from the results of this position detection operation.

(4) A construction may be adopted in which (i) an infrared CCD camera is mounted to the game machine main unit 10, and (ii) an infrared photoemitting element is incorporated in each glove unit 21 and 22, so that the loci of the glove units 21 and 22 are calculated by specifying the infrared light emission positions via the CCD camera and sequentially storing these positions in memory. Furthermore, instead of mounting photoemitting elements in the glove units 21 and 22, special coatings may be applied to the gloves such that the areas on which the coating was applied are detected using the CCD camera.

(5) A construction may be adopted in which, in addition to incorporating a three-axis acceleration sensor in each glove unit 21 and 22, a tube that contains water or another liquid is located in the wire connected to each glove unit 21 and 22. More accurate position movement detection may be performed through the detection of the height of the surface of this liquid, that is, based on the combination of (i) the results of the detection of the directions of movement of the glove units 21 and 22 by the three-axis acceleration sensor, and (ii) the liquid surface height detection information.

Figure 28:
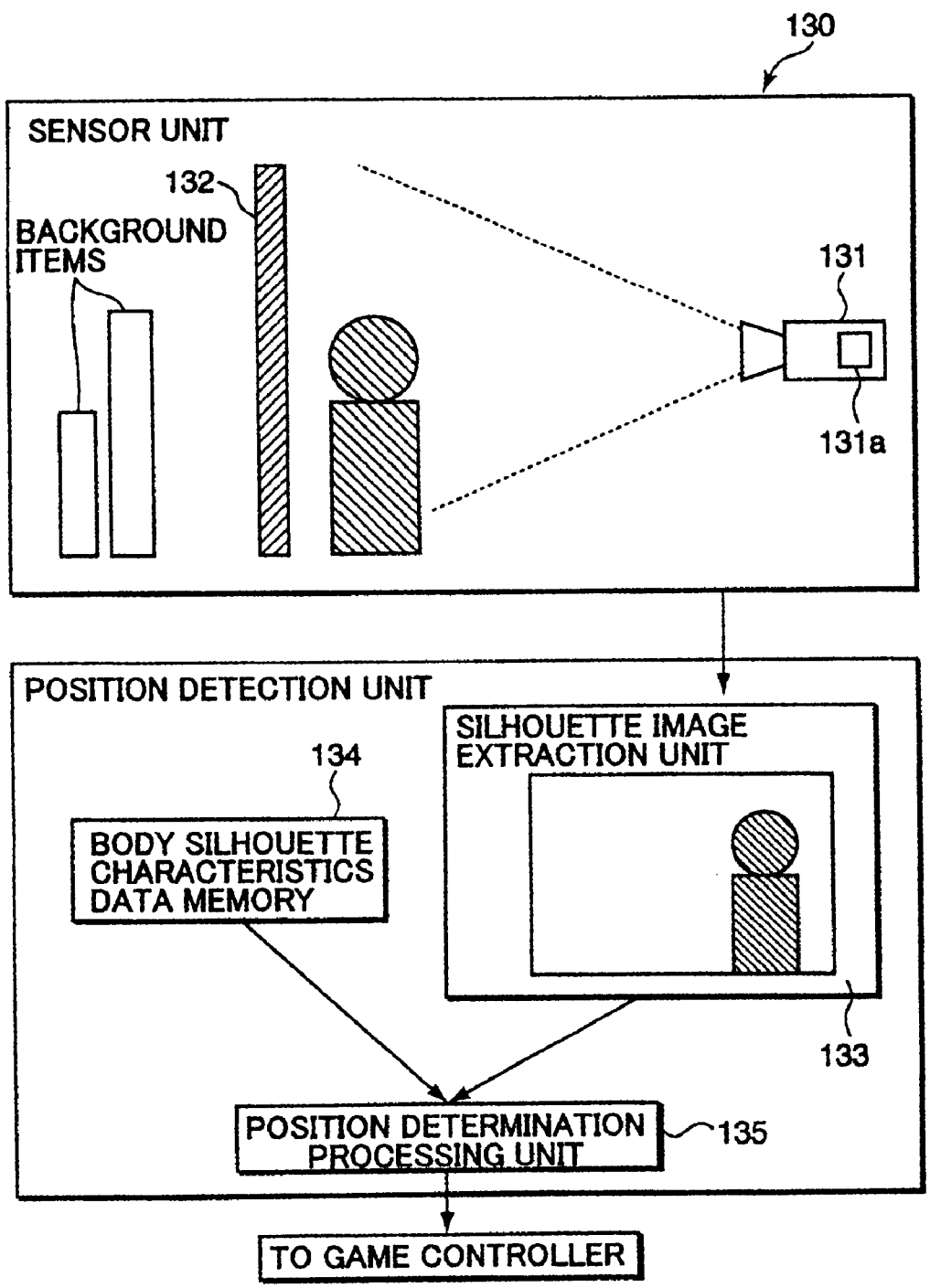
FIG. 28 is a block diagram showing another embodiment of the head detection unit.

FIG. 28 is a block diagram showing another embodiment of the head detection unit 30 of the 3D video game device pertaining to the present invention. While this game device differs somewhat in appearance from the device shown in FIG. 1, with the exception of the construction of the head detection unit 30, it is functionally identical thereto.

In the second embodiment, the head detection unit 130 comprises (i) a CCD camera 131, for example, which works as an image capture means and is located directly below the monitor 11 and in a horizontally central position, as well as (ii) a background eliminating member 132 that is erected behind the play space and has on its front surface a screen of a single color such as blue or of two colors arranged in a striped pattern. The head detection unit 130 also includes a silhouette image extraction unit 133, a body silhouette characteristics data memory 134 that stores body silhouette characteristics data, and a position determination processing unit 135. The CCD camera 131 is oriented such that the play space is captured in the image.

The CCD camera 131 has an angle of view such that the background eliminating member 132 comprises the field of view, and such that the background items behind the background eliminating member 132 (such as the various equipment (including other game machines) or people seen at the game arcade) are not included in the captured image, and it is preferred that the CCD camera 131 comprise a color image capture means that includes filters for each RGB color that are located on the front surface of the CCD element. The CCD camera 131 faces the background eliminating screen 132 and performs image capture according to prescribed cycles, for example, in cycles of $\frac{1}{60}^{th}$ of a second, or at cycles that enable changes in the position of the player's head to be tracked at a desired resolution, and the captured images are stored in an internal image memory 131a after undergoing address management. The silhouette image extraction member 133 extracts the silhouette of a body by performing processing to eliminate blue images (in the case of a single-color camera, patternless images) from the image data that includes the player and the background eliminating member 132 located behind the player and that is contained in the image memory 131a. This extraction routine may simply comprise processing in which blue regions are deemed regions having no data. Where the background eliminating member 132 has a striped pattern, processing to eliminate this basic pattern may be performed.

The position determination unit 135 (i) uses pattern recognition technology to extract the head from the body silhouette obtained by the silhouette image extraction unit 133 and from the body silhouette characteristics data in the body silhouette characteristics data memory 134, (ii) seeks the position of the eyes in the head, i.e., the center position in the head region, for example, and (iii) performs position determination by deeming this position to be the position of the eyes. The obtained position information is transmitted to the game control unit 100, and is thereafter used as viewpoint information as in the first embodiment.

In addition to the head detection units 30 and 130 used in the first and second embodiments, respectively, the present invention may adopt the following constructions:

(1) A construction may be adopted in which (i) the CCD camera used in the head detection unit 130 of the second embodiment is converted into an infrared camera by the placement of an infrared filter in front of the CCD image capture surface, (ii) an infrared light source that emits infrared light over a range covering the background eliminating member 132 is placed at a position near the infrared camera, and (iii) a substance that absorbs infrared light is applied to the front surface of the background eliminating member 132. Using this construction, because no infrared light is reflected back from the background eliminating member 132 to the infrared camera, the region of the image capturing the background eliminating member 132 becomes dim, and because as a result the difference in brightness between such region and the region reflected from the player can be emphasized, the body silhouette may be easily extracted. Alternatively, a construction may be adopted in which a substance that reflects infrared light is applied to the front surface of the background eliminating member 132. Using this construction, because the light is strongly reflected from the background eliminating member 132 back to the infrared camera, the region of the image capturing the background eliminating member 132 becomes quite bright, and because as a result the difference in brightness between such region and the region reflected by the player can be emphasized, the body silhouette can be easily extracted.

It is also acceptable if a construction is adopted in which the background eliminating member has alternating infrared absorbing regions and infrared reflecting regions arranged in a striped pattern, which would also, like the striped pattern of the second embodiment, permit easy extraction of a body silhouette.

Figure 29:
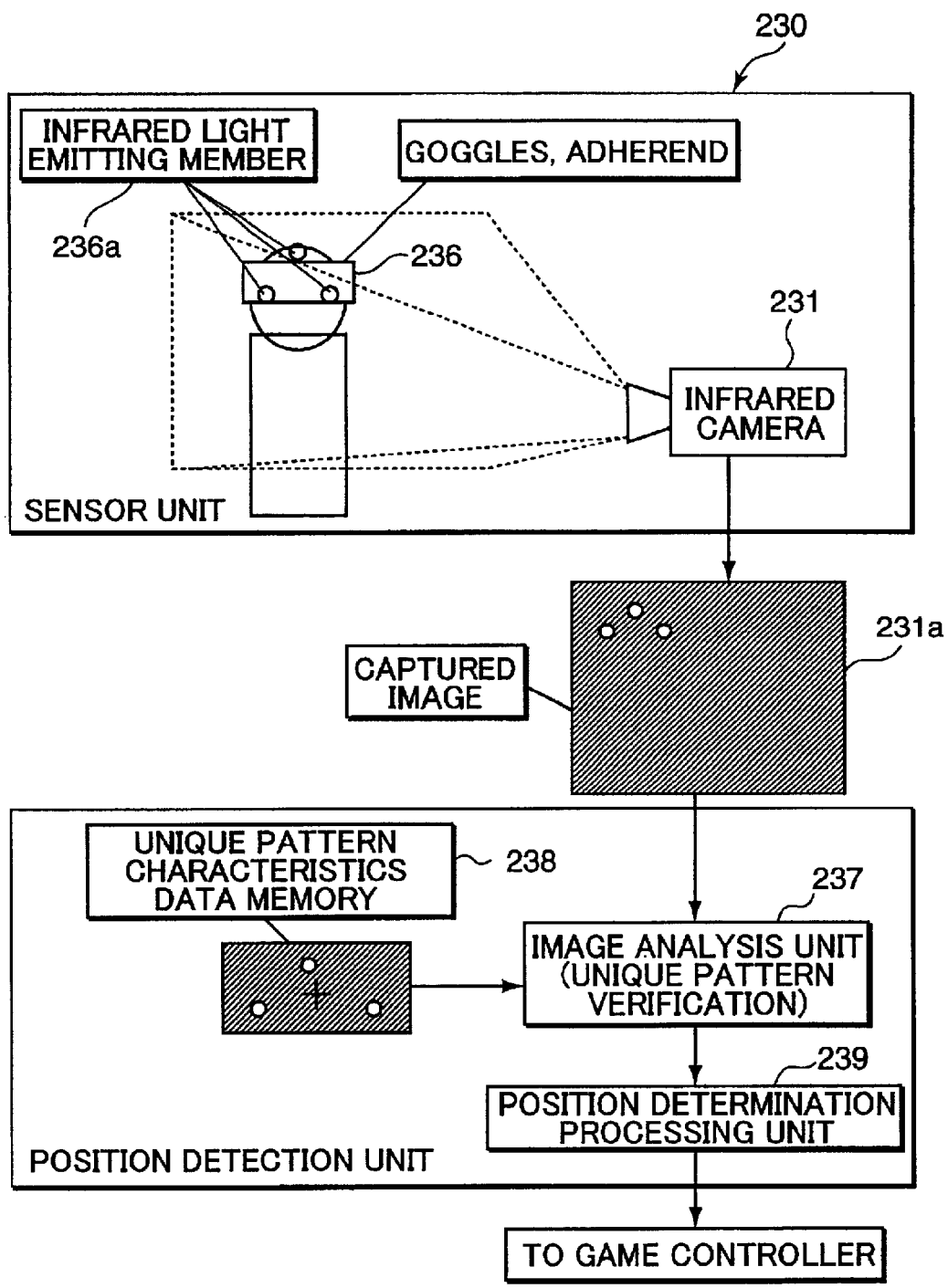
FIG. 29 is a block diagram showing yet another embodiment of the head detection unit.

(2) FIG. 29 is a block diagram showing another embodiment of the head detection unit. The head detection unit 230 comprises the infrared camera 231 explained with reference to the construction (1) above, and includes goggles or a head attachment 236 that may be mounted to the player's face or head, arrayed on which are a prescribed number, such as three, of small infrared photoemitting members 236a that emit infrared light, as well as an image memory 231a, an image analyzer 237, a unique pattern characteristics data memory 238 and a position determination processing unit 239, which are located inside the processing unit. When the infrared camera 231 captures an image of the player, three brightness points 236b are obtained as image data and placed in the image memory 231a, the image pattern comprising these three points is compared with the data in the unique pattern characteristics data memory 238 by the image analyzer 237, and the stored positions in the image memory 231a, i.e., the addresses, are specified. The position determination processing unit 239 calculates the position of the player's eyes based on a preset equation using the address information for the three points, and this position is sent to the game controller 100. Furthermore, the number of infrared photoemitting members 236a is set at three, but as a practical matter detection may be carried out with at least one member. However, because the use of two or more allows the angle of the head or face to be detected at the same time, such a construction offers the advantage of enabling the more accurate determination of the position of the player's eyes.

Furthermore, it is also acceptable if, (i) instead of the infrared photoemitting members 236a, a prescribed number of reflective mirrors that reflect infrared light are located on the head attachment 236, and (ii) an infrared photoemitting means having a wide irradiation range is mounted to the game machine main unit 10, enabling the infrared camera 231 to capture light reflected from the reflective mirrors, which provides the same effect as that described above. In this case, the absence of a need for a power supply, drive means and the like on the head attachment 236 to emit infrared light enables the head attachment 236 to be made smaller and lighter.

Figure 30A:
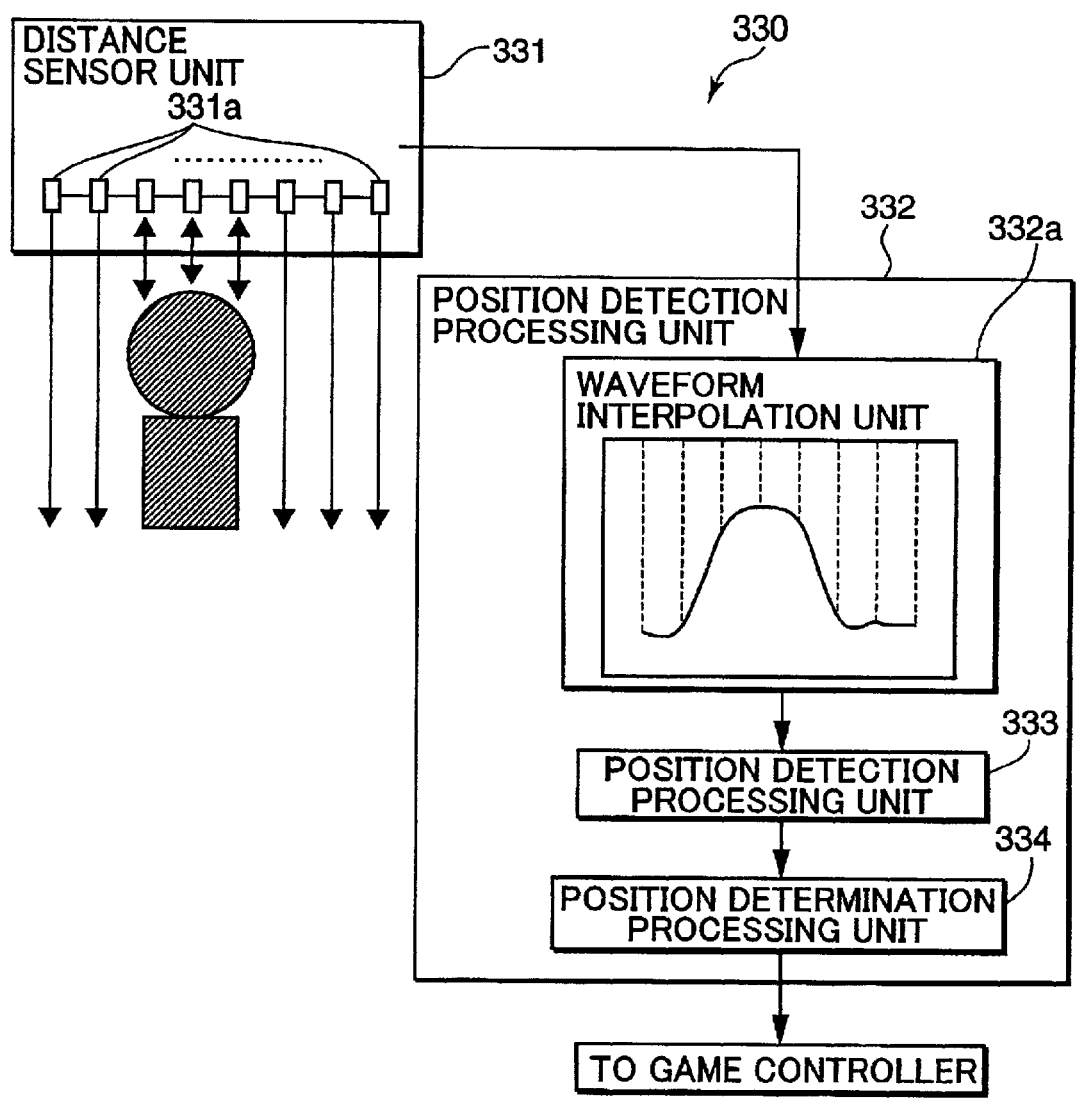
FIG. 30A is a block diagram and FIG. 30B is a diagram to explain position determination.
Figure 30B:
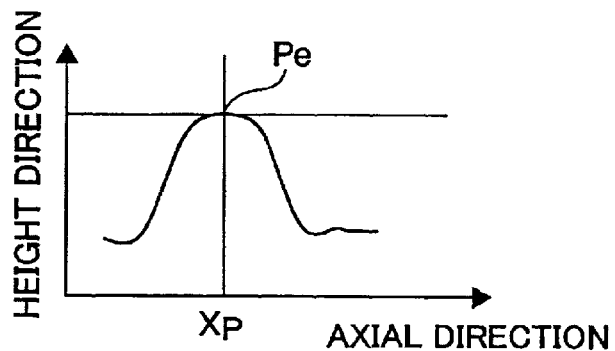

(3) FIG. 30 shows yet another embodiment of the head detection unit. In the drawing, FIG. 30A is a block diagram and FIG. 30B is a drawing to explain position detection.

The head detection unit 330 includes a distance sensor unit 331 comprising multiple ultrasonic transmitter/receivers 331a aligned horizontally at a prescribed pitch at the top of the play space, as well as a position detection processing unit 332, a peak point detection unit 333 and a position determination processing unit 334, which are located in the processing unit. As is known in the art, the ultrasonic transmitter/receivers 331a each include at least a piezoelectric element, an excitation member that excites the piezoelectric element via pulse signals and causes it to transmit ultrasonic pulses, a receiver unit that receives the reflected pulses, a circuit to switch the signal I/O direction, etc. The distance sensor unit 331 may comprise a reflection-type (preferably infrared light-based) sensor having a photoemitter part and a photoreceptor part. Each ultrasonic transmitter/receiver 331a of the distance sensor unit 331 has a directional width that extends directly downward such that at least one (preferably more than one) can detect the position of the player's head in the play space. Alternatively, the ultrasonic transmitter/receivers 331a are mounted at intervals narrower than the width of a normal head.

The ultrasonic transmitter/receivers 331a can simultaneously transmit ultrasonic waves, but it is acceptable if, in order to prevent adjacent transmitter/receivers from interfering with each other, they transmit ultrasonic waves sequentially in a rapid procession, or if at least alternating ultrasonic transmitter/receivers 331a are caused to transmit ultrasonic waves at the same time such that adjacent transmitter/receivers alternate in their transmission. However, because when narrow-directivity ultrasonic beams are used, the data received by the transmitting ultrasonic transmitter/receiver 331a is deemed the shortest distance data, there is no particular obstacle in identifying the ultrasonic transmitter/receiver 331a that obtains the smallest distance data even where a nearby ultrasonic transmitter/receiver 331a also receives the reflected waves.

As shown in FIG. 30, the returning waves reflected from the player's head are received by the transmitting ultrasonic transmitter/receivers 331a, and by seeking the distance calculated from the interval between the transmission time and the receipt time of these waves via the position detection processing unit 332 using sound velocity information, data (shown as an image in graph 332a) showing the relationship between the pitch width of the ultrasonic transmitter/receivers 331a and the distance is obtained. The peak point detection unit 333 uses the above pitch width and distance data to detect the height position Pe and the right/left position Xp of the peak point, as shown in FIG. 30B. Because the height direction waveform is mountain-shaped, as shown in FIG. 30B, by using a model function or the like set beforehand in the position detection unit 332 to give it a function to create continuous data, the peak point detection unit 333 can perform detection even where the peak point is located between ultrasonic transmitter/receivers 331a. The position determination processing unit 334 can determine the height position of the player's eyes by subtracting a prescribed value from the height position Pe, which is the player's detected head top, and the right/left position can be determined from the mounting pitch of the ultrasonic transmitter/receivers 331a. Information regarding the height position and right/left position of the player's eyes obtained in this fashion is transmitted to the game controller 100.

Figure 31:
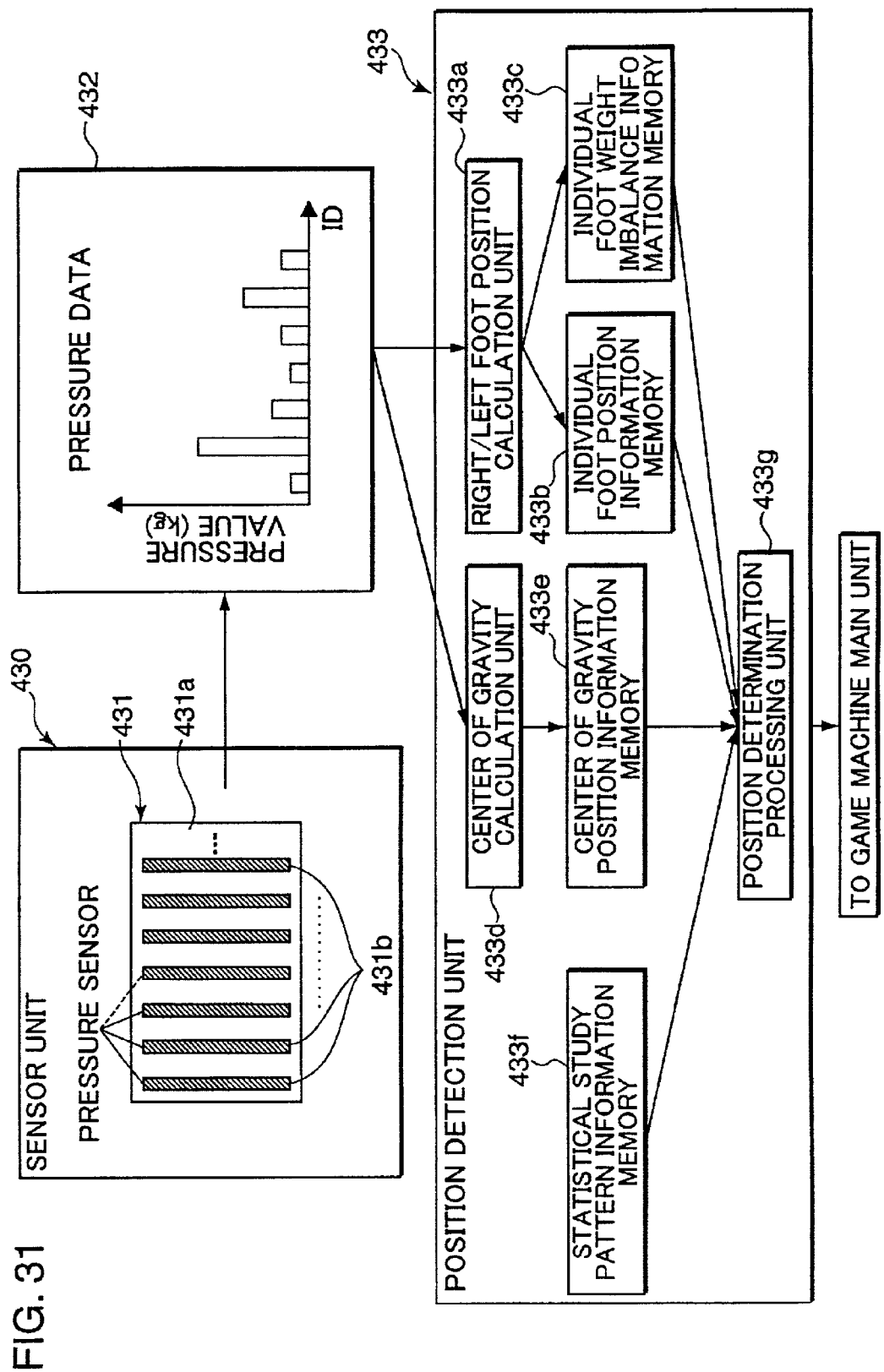
FIG. 31 is a drawing showing yet another embodiment of the head detection unit.

(4) FIG. 31 shows still another embodiment of the head detection unit. The head detection unit 430 has a pressure-sensitive sheet member 431 located on the floor of the play space, which detects the positions of the player's feet and determines the position of the player's head using this information and other information described below.

The pressure-sensitive sheet member 431 includes parallel lengthwise sensors running from front to back and arranged side to side in a right/left direction at a pitch that is at least narrower—preferably sufficiently narrower—than the player's feet (in the drawing, for ease of explanation and illustration, the pitch is drawn more widely than it would be in actuality). A public-domain product may be used for the pressure-sensitive sheet member 431. One such product would be that manufactured by printing lengthwise pressure-sensitive conductive ink strips 431b, such as those formed from thermoplastic resin containing conductive particles and non-conductive particles, which are dispersed and mixed together, for example, on each opposing surface of two flexible film members 431a, for example, such that the ink strips on the two surfaces will correspond to each other, and then by splicing the film members 431a together. Furthermore, connected to each pressure-sensitive conductive ink strip 431 is a lead wire (formed from thermoplastic resin containing such conductive particles as silver in a dispersed and mixed fashion), which has insulating coating and is drawn outside the film. A prescribed voltage is impressed to the lead wires protruding from one film member 431a, while a circuit that detects voltage is connected to the lead wires protruding from the other film member 431a, with each lead wire being recognizable. The contact surfaces of the pressure-sensitive conductive ink strips 431b on both film members 431a, which are spliced together, have a minute amount of surface roughness (caused during printing or due to the existence of very small particles), and based on the change in the effective contact area between the ink strip surfaces due to the application of pressure on the film members 431a, i.e., due to the change in the resistance in the contact surface, the voltage that appears on the lead wires on the other side may be detected in an analog fashion.

The pressure data memory 432 associates and stores the voltage values, i.e., the pressure data, detected from the voltage detection circuit of the individual pressure-sensitive conductive ink strips 431b. In the drawing, the contents of the memory are displayed as an image in the form of a distribution chart. The right/left foot detection unit 433a calculates position information for each foot in the right/left direction on the pressure-sensitive sheet member 431 by seeking from the contents of the pressure data memory 432 the center of the region in which the weight was deemed received from the right or left foot, and the calculated position information is stored in a right/left foot position information memory 433b. Moreover, the right/left foot position detection unit 433a accumulates the pressure data regarding the foot region for each foot, and stores the accumulated value in the right/left weight imbalance information memory 433c.

The center of gravity calculation unit 433d calculates the center of gravity position of the weight on the pressure-sensitive sheet member 431 in the right/left direction, i.e., the position of the hips, from the contents of the pressure data memory 432, and the results of this calculation are stored in the center of gravity position information memory 433e. The statistical learning pattern memory 433f stores pattern data to estimate, based on principles derived from the field of human engineering or from an empirical viewpoint, the position of the head from the position of the feet, the imbalance in body weight, the position of the hips and the like. The position determination unit 433g determines the position of the player's head based on the contents of the right/left foot position information memory 433b, the right/left weight imbalance information memory 433c, the center of gravity position information memory 433e and the statistical learning pattern memory 433f. The head position information thus determined is transmitted to the game controller 100.

Because the placement of the pressure-sensitive sheet member 431 in the play space enables the position of the player's head on the pressure-sensitive sheet member 431 in the right/left direction to be determined from the position information for both feet, there is no need to prepare a particular location or construction for the head detection unit.

(5) FIG. 32 is a drawing showing another embodiment of the pressure-sensitive sheet member comprising the head detection unit. The head detection unit 530, which has a pressure-sensitive sheet member 531 placed in the play space, detects the positions of both of the player's feet and determines the position of the player's head based on this information and on other information described below.

Figure 32C:
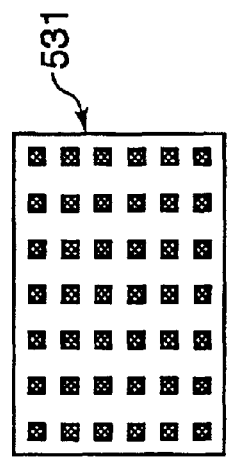
FIG. 32 is a drawing showing another embodiment of the pressure sheet member of the head detection unit.
Figure 32B:
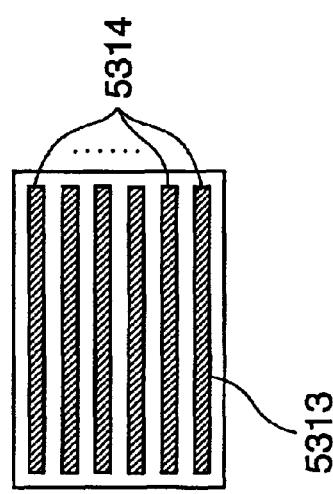
Figure 32A:
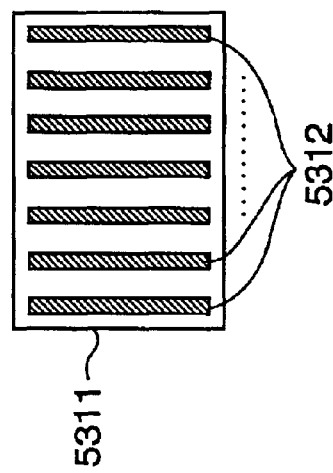

The pressure-sensitive sheet member 531 is built using basically the same materials and principle as the member described with reference to the construction (4) above. In other words, as shown in FIG. 32A, lengthwise pressure-sensitive conductive ink strips 5312 are formed at a prescribed pitch on the back surface of one film member 5311, while as shown in FIG. 32B, widthwise pressure-sensitive conductive ink strips 5314 are formed at a prescribed pitch on the back surface of another film member 5313, and by splicing the film members together such that the back surfaces of both films face each other, a film member 5311 composed of a matrix of pressure-sensitive units, as shown in FIG. 32C, is manufactured. In addition, a prescribed voltage is sequentially impressed to the lead wire of each pressure-sensitive conductive ink strip 5312 of the film member 5311, for example, in a rapid procession, while a voltage detection circuit is connected to the lead wire of each pressure-sensitive conductive ink strip 5314 of the other film member 5313. The positions of the feet on the pressure-sensitive sheet member 531 may be identified from the timing at which the voltage is impressed to each pressure-sensitive conductive ink strip 5312 and the pressure-sensitive conductive ink strips 5314 which were detected by the voltage detection circuit as having received pressure, and the level of the voltage may be detected. If this pressure-sensitive sheet member 531 is used, the positions of the player's feet can be determined two-dimensionally, i.e., in both the right/left and front/back directions. In this embodiment, if the position detection unit 433 shown in FIG. 31 is used, and the position determination processing unit 433g has the two-dimensional position determination processing function, the position of the player's head on the pressure-sensitive sheet member 531 can be detected in three dimensions.

The ability to determine the position of the player's head in three dimensions in this way enables the viewpoint on the monitor 11 within the game space to be shifted toward or away from the player.

(6) When the pressure-sensitive sheet member shown in the construction (4), which instead has pressure-sensitive conductive ink strips arranged in the front/back direction, is used in addition to the head detection unit 130 of the second embodiment or the head detection unit described with reference to the constructions (1) through (3) above, the position of the player's head in the front/back direction can be specified using this pressure-sensitive sheet member, and consequently, the position of the player's head can be specified in three dimensions via the two detection units.

(7) In the first embodiment, the ultrasonic receivers 32 and 33 were placed along a straight line to the right and left of the ultrasonic transmitter 31, and the height position and right/left position of the player's head was detected based on this construction, but alternatively, a construction may be adopted in which (i) three ultrasonic receivers are placed at prescribed locations on a horizontal plane that includes the ultrasonic transmitter, (ii) three ellipsoids are determined by each ultrasonic receiver from the time of measurement, i.e., the distance information, and (iii) their intersection points are detected as the head position. This construction offers the advantage that the head position can be detected within a three-dimensional space. This construction requires only a minimum of three ultrasonic receivers.

(8) For these embodiments, the example of a boxing match was used, but the present invention may be applied in the same fashion in other types of games in which the player engages in combat with another character by moving along at least two axes.

Summing up the aforementioned descriptions, the present invention relates to a match-style 3D video game device controller that generates operation signals based on which game action instructions are issued, including a pair of right and left main units configured to allow manual operation and motion detection units that are each mounted in each main unit and individually detect movement along at least two axes, as well as output detected movement as operation signals.

According to the aforementioned aspect of the invention, if each main unit is moved by hand while being held by the player's right and left hands or worn like gloves, movement of the hand is detected in accordance with the direction of the movement of the main unit, and various types of games may be played based on this detection.

In the match-style 3D video game device controller, each of the motion detection units individually may be set to detect movement along three axes. Using this construction, because movement along three axes can be detected as the directions of hand movement, more complex game action may be performed based on the various operation signals.

In the aforementioned video game device controller, each of the main units is preferably formed in the shape of a glove in which a hand is inserted. With this feature, because the controller may be operated with the player's hands inside the device, it is well suited for use in fighting games such as boxing games.

Furthermore, in the aforementioned match-style 3D video game device controller, the controller may include a signal line to enable connection with the game machine. Using this construction, because the controller can be connected to the game machine, the connection can also be used to prevent theft of the controller.

Moreover, in the match-style 3D video game device controller, each of the motion detection units may be set to comprise an acceleration sensor placed so as to operate in each direction. Using this construction, hand movement can be detected relatively easily. With this feature, hand movement can be detected relatively easily.

Another aspect of the present invention relates to a match-style 3D video game device including a monitor that is positioned at a prescribed height relative to the game machine housing and displays images, the controller that is described in any of the aforementioned forms and that causes the content of the game operation to be reflected in the game action, game control means that controls the progress of the game based on operation signals from the controller, display control means that creates three-dimensional images from the viewpoint of a virtual camera and displays them on the screen of the monitor, head detection means that detects the position of the head of a player positioned within the play space in front of the monitor screen in at least the right and left directions in the space surrounding such head, and viewpoint change means that moves the viewpoint of the virtual camera in accordance with the direction and amount of change in the detected head position.

According to the aforementioned aspect of the present invention, because the position of the head of the player playing at a position facing the monitor is detected and the viewpoint of the virtual camera used in the game is moved based on the results of this detection, a more realistic feel can be provided to the player. Moreover, if the operation signals from the controller are controlled with regard to the connecting or missing of a punch, for example, in accordance with the viewpoint of the virtual camera, a more complex and enjoyable game can be provided.

In the match-style 3D video game device, the head detection means preferably detects the height of the head. Using this construction, because both the right/left direction and height direction are detected, the viewpoint of the virtual camera can be changed to the desired position.

In addition, in the aforementioned match-style 3D video game device, the display control means may be set to display an opponent character on the monitor screen as a game image, while the game control means displays the opponent character throwing a punch and instructs that a hit effect routine be performed such that a punch is landed on the player when there is a virtual camera viewpoint aiming in the direction in which the punch was thrown. Using this construction, a punch is thrown by the opponent character either randomly or in accordance with prescribed game rules, and if the player is directly facing the monitor when such a punch is thrown, a hit effect routine is performed to indicate that the punch landed, providing a highly realistic game.

Furthermore, in the match-style 3D video game device, the display control means causes the image displayed on the monitor screen to shake along at least one axis for a prescribed period of time upon the receipt of an instruction for a hit effect routine. Using this construction, because when a punch is received from the opponent character, the entire image displayed on the monitor screen is shaken, the sensation of receiving a punch is realistically conveyed. When this is done, if the entire image is slightly streaked in the direction in which the punch was thrown while being shaken, the game is made more effective.

Moreover, in the match-style 3D video game device, the game control means is preferably to process the operation signals from the motion detection units as thrown punch signals and instructs the execution of a hit effect routine such that punches land on the opponent character displayed on the monitor screen. Using this construction, because hit effect display is performed in response to the opponent character on the monitor screen receiving a punch, realistic action is portrayed.

Furthermore, in the aforementioned match-style 3D video game device, the display control means may be set to display a damage action on the opponent character being shown on the monitor screen upon the receipt of an instruction for a hit effect routine. Using this construction, if hit effect display indicating damage to the opponent character is performed during the hit effect routine, the player will become even more eager to play the game.

Moreover, in the match-style 3D video game device, the game control means may be set to recognize whether the operation signals came from the right or left motion detection unit, and the display control means may be set to display, as a damage action regarding an operation signal from one motion detection unit, the opponent character on the monitor screen leaning toward the other side. Using this construction, by carrying out hit effect display in which the opponent character sways in the opposite direction depending on the direction of the punch thrown by the player, i.e., whether the punch is thrown by the right or left fist, realistic action is portrayed.

In addition, in the match-style 3D video game device, the game control means sets a hitting area at one or more locations on the body of the opponent character on the monitor screen and sets a defensive region that overlaps with the hands of the opponent character as seen from the virtual camera viewpoint, and wherein when the defensive region is outside the hitting area, the display control means displays a hitting mark on the hitting area. Using this construction, the timing for a valid punch and the hitting position are indicated by means of a mark. With this feature, because the timing for a valid punch and the hitting position are indicated by means of a mark, the player's punches can be effectively guided.

In the match-style 3D video game device, the game control means may be set to recognize the type of the operation signal and associates different types of operation signals with different hitting areas. Using this construction, when a punch corresponds to a certain type of punch, it is processed as a valid punch.

In the match-style 3D video game device, the game control means may be set to confer points when an operation control signal is received upon the display of the hitting mark M. Using this construction, a punch that is thrown at the proper timing for hitting is deemed valid.

This application is based on Japanese Patent Application Serial No. 2000-350252 filed in Japanese Patent Office on Nov. 16, 2000, the contents of which are hereby incorporated by reference.

Although the present invention has been fully described by way of example with reference to the accompanied drawings, it is to be understood that various changes and modifications will be apparent from the scope of the present invention hereinafter defined, they should be construed as being included therein.

What is claimed is:

1. A match-style 3D video game device, comprising:
a monitor that is positioned at a prescribed height on which images are displayed;
a 3D video game device controller that generates operation signals based on a particular game action that is instructed, said 3D video game device including:
  a pair of right and left main units configured to allow manual operation, said main units being wearable by a game player; and
  right and left motion detection units that are respectively mounted in each of said right and left main units for individually detecting movement along at least two axes and outputting detected movement as operation signals, said 3D video game device controller causes a content of the operation thereof to be reflected in the particular game action;
game control means for controlling the progress of the game based on operation signals from the 3D video game device controller;
display control means for creating three-dimensional images from a viewpoint of a virtual camera and for displaying said three-dimensional images on the screen of said monitor, said three-dimensional images including an opponent character displayed as facing the game player when said game player is positioned in a play space in front of said monitor screen;
head detection means for detecting a position of a head of the game player in at least right and left directions relative to a fixed position of the monitor screen when said game player is positioned in the play space;
viewpoint change means for moving the viewpoint of said virtual camera in accordance with a direction and amount of change in the detected head position relative to the fixed position of the monitor screen;
said game controller means including means for setting a hitting area at at least one location on a body of the opponent character displayed on the monitor screen and for setting a defensive region that overlaps with hands of the opponent character and the body of the opponent as seen from said virtual viewpoint; and
said display control means displays a hitting mark on said hitting area when said defensive region is outside said hitting area.

2. The match-style 3D video game device according to claim 1, wherein said head detection means includes means for detecting a height of the head.

3. The match-style 3D video game device according to claim 1, wherein said display control means displays an opponent character on said monitor screen as a game image, while said game control means displays the opponent character throwing a punch and instructs that a hit effect routine be performed such that a punch is landed on the player when there is a virtual camera viewpoint aiming in the direction in which said punch was thrown.

4. The match-style 3D video game device according to claim 3, wherein said display control means includes causing the image displayed on the monitor screen to shake along at least one axis for a prescribed period of time upon receiving an instruction for a hit effect routine.

5. The match-style 3D video game device according to claim 1, wherein said game control means processes the operation signals from the motion detection units as thrown punch signals and instructs that a hit effect routine be performed such that punches land on the opponent character displayed on the monitor screen.

6. The match-style 3D video game device according to claim 5, wherein said display control means displays a damage action on the opponent character being shown on the monitor screen upon receiving an instruction for the hit effect routine.

7. The match-style 3D video game device according to claim 6, wherein:
said game control means includes for recognizing from which of said right or left motion units said operation signals originated; and
said display control means displays, as a damage action in response to an operation signal from a recognized one of the left and right motion detection units, the opponent character on the monitor screen leaning toward an opposite side.

8. The match-style 3D video game device according to claim 5, wherein:
said means for setting a hitting area sets a plurality of hitting areas at a plurality of locations on a body of the opponent character displayed on the monitor screen; and
said game control means includes means for recognizing a type of said operation signal and for associating different types of operation signals with different one of said plurality of hitting areas.

9. The match-style 3D video game device according to claim 5, wherein said game control means includes means for conferring points responsive to receipt of an operation control signal upon the display of said hitting mark.

10. The match-style 3D video game device according to claim 1, wherein each of said right and left motion detection units individually detects movement along three axes.

11. The match-style 3D video game device according to claim 1, wherein each of said right and left main units is formed in a shape of a glove in which a hand of the game player is inserted.

12. The match-style 3D video game device according to claim 1, wherein said 3D video game device controller includes a signal line to enable connection with another portion of the 3D video game device.

13. The match-style 3D video game device according to claim 1, wherein each of said right and left motion detection units comprises an acceleration sensor placed so as to operate to detect movement along each of said at least two axes.

14. The match-style 3D video game device according to according to claim 1, wherein viewpoint change means moves the viewpoint of the virtual camera in accordance with the direction and amount of change in the detected head position such that said viewpoint of said virtual camera approximates a view seen by the game player such that the defensive region that overlaps with the hands of the opponent character and the body is changed in position on the opponent's body.

15. A match-style 3D video game device, comprising:
a monitor screen that is positioned at a prescribed height on which images are displayed;
a 3D video game device controller that generates operation signals based on a particular game action that is instructed, said 3D video game device including:
  a pair of right and left main units configured to allow manual operation; and
  right and left motion detection units that arc respectively mounted in each of said right and left main units for individually detecting movement along al least two axes and outputting detected movement as operation signals, said 3D video game device controller causing a content of the operation thereof to be reflected in the particular game action;

game control means for controlling progress of the game based on operation signals From the 3D video game device controller, said game control means including means for setting a hitting area at at least one location on a body of an opponent character displayed on the monitor screen so that said hitting area moves on said monitor screen according to the movement of the opponent character and for setting a defensive region that overlaps with hands of the opponent character and the body of the opponent as seen from said virtual camera viewpoint, said display control means displaying a hitting mark on said hitting area when said defensive region is outside said hitting area;

display control means for creating three-dimensional images from a viewpoint of a virtual camera and for displaying said three-dimensional images on the screen of said monitor;

head detection means for detecting a position or a head of the game player positioned in a play space in front of said monitor screen in at least right and left directions within a space surrounding the head of the game player; and viewpoint change means for moving the viewpoint of said virtual camera in accordance with a direction and amount of change in the detected head position such that said viewpoint of said virtual camera essentially matches a view seen by the game player.

* * * * *